US012443651B2

(12) United States Patent
Kim et al.

(10) Patent No.: US 12,443,651 B2
(45) Date of Patent: Oct. 14, 2025

(54) VISUAL OBJECT GRAPHS

(71) Applicant: Pinterest, Inc., San Francisco, CA (US)

(72) Inventors: Eric Kim, San Francisco, CA (US); Dmitry Olegovich Kislyuk, San Ramon, CA (US)

(73) Assignee: Pinterest, Inc., San Francisco, CA (US)

( * ) Notice: Subject to any disclaimer, the term of this patent is extended or adjusted under 35 U.S.C. 154(b) by 18 days.

(21) Appl. No.: 18/344,397

(22) Filed: Jun. 29, 2023

(65) Prior Publication Data

US 2023/0342390 A1    Oct. 26, 2023

Related U.S. Application Data

(62) Division of application No. 17/848,040, filed on Jun. 23, 2022, now Pat. No. 11,727,049, which is a division of application No. 16/883,286, filed on May 26, 2020, now Pat. No. 11,373,403.

(51) Int. Cl.
| | | |
|---|---|---|
| G06F 16/55 | (2019.01) | |
| G06F 17/16 | (2006.01) | |
| G06F 18/22 | (2023.01) | |
| G06F 18/23 | (2023.01) | |

(Continued)

(52) U.S. Cl.
CPC .............. *G06F 16/55* (2019.01); *G06F 17/16* (2013.01); *G06F 18/22* (2023.01); *G06F 18/23* (2023.01); *G06T 7/10* (2017.01); *G06V 20/30* (2022.01)

(58) Field of Classification Search
USPC ................................................ 382/103, 305
See application file for complete search history.

(56) References Cited

U.S. PATENT DOCUMENTS

| | | |
|---|---|---|
| 7,907,184 B2 | 3/2011 | Murata et al. |
| 8,135,222 B2 | 3/2012 | Bressan |
| 8,958,646 B2 | 2/2015 | Huang et al. |

(Continued)

FOREIGN PATENT DOCUMENTS

WO    2018118803 A1    6/2018

OTHER PUBLICATIONS

Philbin et al., Object Mining using a Matching Graph on Very Large Image Collections, 2008 IEEE 978-0-7695-3476-3/08, Sixth Indian Conference on Computer Vision, Graphics & Image Processing, pp. 738-745 (Year: 2008).*

(Continued)

*Primary Examiner* — Ishrat I Sherali
(74) *Attorney, Agent, or Firm* — Haynes and Boone, LLP

(57) ABSTRACT

Disclosed are implementations that enable the linking or connection of objects and different scenes in which those objects are represented. For example, a corpus of scenes (e.g., digital images) that include a representation of one or more objects may be processed using the disclosed implementations to segment from those scenes the individual objects represented in those scenes. The disclosed implementations may further determine clusters of visually similar object segments and form object clusters for those object segments. The scenes that include those object segments are also linked to the object cluster. With scenes linked to different object clusters, a user may select one or more query objects or a query scene and be presented with other scenes that include visually similar objects, even though the overall scenes may be visually different.

18 Claims, 21 Drawing Sheets

(51) Int. Cl.
*G06T 7/10* (2017.01)
*G06V 20/30* (2022.01)

(56) References Cited

U.S. PATENT DOCUMENTS

| | | | |
|---|---|---|---|
| 9,177,226 | B2 | 11/2015 | Rabinovich et al. |
| 9,218,365 | B2 | 12/2015 | Irani et al. |
| 9,904,867 | B2 | 2/2018 | Fathi et al. |
| 10,277,960 | B2 | 4/2019 | Markel et al. |
| 10,515,110 | B2 | 12/2019 | Jing et al. |
| 11,048,734 | B1 | 6/2021 | Harris et al. |
| 11,055,343 | B2 | 7/2021 | Xu et al. |
| 11,373,403 | B2 * | 6/2022 | Kim .................... G06F 16/5854 |
| 11,727,049 | B2 * | 8/2023 | Kim ........................ G06F 18/23 382/103 |
| 2006/0078312 | A1 | 4/2006 | Murata et al. |
| 2006/0251292 | A1 | 11/2006 | Gokturk et al. |
| 2008/0212899 | A1 | 9/2008 | Gokturk et al. |
| 2014/0074855 | A1 | 3/2014 | Zhao et al. |
| 2015/0134688 | A1 * | 5/2015 | Jing ........................ G09G 5/14 707/766 |
| 2015/0169998 | A1 | 6/2015 | Rabinovich et al. |
| 2015/0178317 | A1 * | 6/2015 | Spielberg ................ G06F 16/58 382/218 |
| 2017/0017844 | A1 * | 1/2017 | Jeong ................. H04N 21/4312 |
| 2017/0097945 | A1 | 4/2017 | Xu et al. |
| 2017/0308553 | A1 * | 10/2017 | Xu ....................... G06F 16/5866 |
| 2018/0181569 | A1 | 6/2018 | Jarr et al. |
| 2018/0220203 | A1 | 8/2018 | Markel et al. |
| 2019/0095467 | A1 * | 3/2019 | Kislyuk .............. G06F 16/5866 |

OTHER PUBLICATIONS

Estrada, F. J., et al., Appearance-based Keypoint Clustering, 2009 IEEE 978-1-4244-3991-1/09, pp. 1279-12286. (Year: 2009).
Herbst, E., et al., RGB-D Object Discovery via Multi-Scene Analysis, 2011 IEEE 978-1-61284-456-5/11, pp. 4850-4856. (Year: 2011).
International Search Report and Written Opinion for International Application No. PCT/US2021/034109, dated Sep. 28, 2021.

* cited by examiner

VISUAL OBJECT GRAPHS

PRIORITY CLAIM

This application is a divisional application of and claims benefit to U.S. patent application Ser. No. 17/848,040, filed Jun. 23, 2022 and entitled "Visual Object Graphs," which is a divisional of U.S. patent application Ser. No. 16/883,286, filed May 26, 2020 and entitled "Object-To-Object Visual Graph," now issued as U.S. Pat. No. 11,373,403. Both applications are hereby incorporated by reference herein in their entireties.

BACKGROUND

With the ever-expanding amount of accessible digital content available to users and customers, it continues to become more and more difficult to discover relevant content. In addition, as more and more content is visual, there is an increasing need for the ability to search for particular objects or items that are represented in visual content.

DETAILED DESCRIPTION

As discussed further herein, the disclosed implementations enable the linking or connection of objects and different scenes in which those objects are represented. For example, a corpus of scenes (e.g., digital images) that include a representation of one or more objects may be processed using the disclosed implementations to segment from those scenes the individual objects represented in those scenes, referred to herein as object segments. The disclosed implementations may further determine object clusters corresponding to object segments that are visually the same or similar based on, for example, a distance between embedding vectors generated for each object segment. Scenes from which object segments included in an object cluster are linked to the object cluster, thereby providing a link between similar object segments, as specified by the object cluster, and scenes that include those objects. Likewise, in some implementations, a canonical object may be determined for each cluster as representative of the object or visually similar objects included in each of the object segments represented by the object cluster. With object segments/object clusters linked to different scenes in which those object segments appear, a user may select a query object from any scene of the corpus and receive, as recommendations or otherwise, matching scenes that also include a representation of that same or similar query object, canonical objects representative of other objects that co-occur in scenes with the selected object, etc. In other examples, a user may select a query scene from the corpus and be provided with matching scenes that include the same or similar objects, in similar or different configurations, as objects included in the query scene.

As described herein, an object may be any physical object, such as a couch, chair, table, tree, dress, purse, etc. A scene, as used herein, is an item of digital data that includes a representation of one or more objects. For example, a scene may be digital data in the form of a digital image (e.g., .jpg, .gif, .bmp, etc.) that includes a representation of one or more objects. For example, a digital image of a person wearing a dress, shoes, a hat, and holding a purse, is an example of a scene that includes representations of multiple objects (e.g., the person, the dress, the shoes, the hat, and the purse). While the discussion herein may refer to an object included in a scene, it will be understood that the reference is to the object as represented in the scene.

Figure 1:
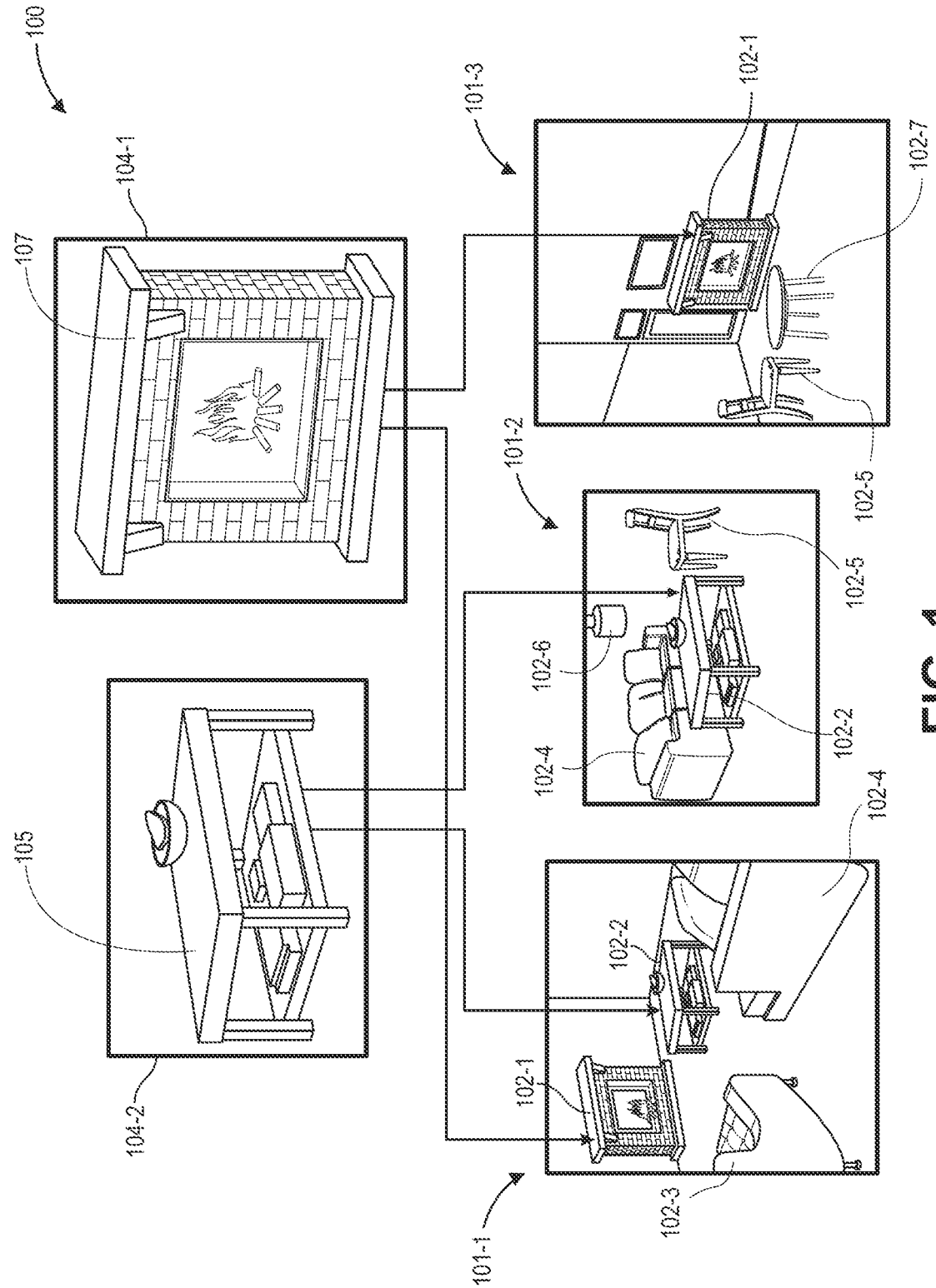
FIG. 1 is an example illustration of detecting objects in scenes and linking those objects to other scenes that include the same or similar objects, in accordance with described implementations.

FIG. 1 is an example illustration 100 of detecting objects in scenes and linking those objects to other scenes that include the same or similar objects, in accordance with described implementations.

As used herein, a query scene is any scene from a corpus of scenes that may be selected, presented, and/or viewed by a user, regardless of whether the user interacts with the scene. A query object, as used herein is any object represented in a query scene. A matching scene, as used herein, is any scene from a corpus that is determined from one or more of the disclosed implementations discussed herein.

In the illustrated example, each of the scenes 101-1, 101-2, 101-3 are digital images. In addition, each scene 101-1, 101-2, 101-3 includes representations of one or more objects 102, or portions of objects. For example, the first scene 101-1 includes a fireplace object 102-1, a table object 102-2, a portion of a chair object 102-3, and a portion of a couch object 102-4. The second scene 101-2 includes a representation of a table object 102-2, a couch object 102-4, a chair object 102-5, and a lamp object 102-6. The third scene 101-3 includes a representation of a fireplace object 102-1, a chair object 102-5, and a table object 102-7.

In accordance with the disclosed implementations, scenes, such as scenes 101-1, 101-2, 101-3 may be processed using one or more image processing algorithms to determine objects represented in those scenes and to extract and generate object segments for each detected object. For example, the first scene 101-1 may be processed and object segments extracted from the scene for each of the objects 102-1, 102-2, 102-3, 102-4 represented in the first scene 101-1. Likewise, the second scene 101-2 may be processed and object segments generated for each of the objects 102-2, 102-4, 102-5, 102-6 represented in the second scene 101-2. The third scene 101-3 may also be processed and object segments generated for the objects 102-1, 102-5, 102-7 represented in the third scene 101-3.

One or more processing algorithms (e.g. image processing algorithms) or deep neural networks may be used to process scenes to detect objects represented in the scenes and to extract object segments for each detected object. In some implementations, information about a scene, such as metadata associated with the scene may be used to determine a scene category, such as clothing, home and garden, furniture, sports, etc., and the processing algorithm or deep neural network may utilize that information to focus the processing, increase processing accuracy, and/or increase processing speed. For example, in some implementations, a region-based convolution neural network ("R-CNN"), such as a faster R-CNN or Detectron, may be utilized to detect objects that are then extracted as object segments. If a category for a scene is determined, for example from metadata or image processing of the scene, the CNN may be tuned or selected to search for and identify objects that relate to the category.

Once object segments have been extracted, the object segments may be compared, and object clusters formed for visually similar objects and optionally an object selected as representative of the cluster, referred to herein as a canonical object. Scenes that include those objects are also linked to the formed object clusters. For example, as illustrated at a high level, object segments may be generated for the table objects 102-2 represented in the first scene 101-1 and the second scene 101-2 and those visually similar object segments may be clustered into an object cluster 104-2 and a canonical object 105 selected as representative of that object cluster 104-2. Likewise, the fireplace object 102-1, represented in both the first scene 101-1 and the third scene 101-3 may be segmented from the scenes, determined to be visually similar, clustered as object cluster 104-1, a canonical object 107 selected as representative of that object cluster 104-1, and the first scene 101-1 and the third scene 101-3 linked to the object cluster 104-1. Other visually similar objects represented in two or more scenes may be likewise clustered into respective object clusters. For example, an object cluster may be formed for the chair object 102-5 represented in the second scene 101-2 and the third scene 101-3.

While the example illustrated in FIG. 1 shows the same objects in different scenes being clustered, in some implementations, the objects do not have to be the same object. For example, as discussed below, visually similar objects may be clustered into the same object cluster based on a distance between embedding vectors generated for the objects/object segments. Likewise, the disclosed processing and clustering of objects into object clusters and the linking of scenes that include those object segments to the object clusters may be performed on each scene of a corpus of scenes and a scene may be linked to multiple object clusters. A corpus of scenes may include any number of scenes, each scene including one or more objects. Still further, the canonical object selected for a cluster may be any object segment associated with that cluster. In some implementations, the canonical object may be selected as the object segment having an embedding vector that is closest to a center of all embedding vectors included in the object cluster. In other implementations, the canonical object may be randomly selected from the object segments associated with the cluster. In still other examples, the canonical object may be selected as an object segment that has a highest number of embedding vectors within a defined distance of the embedding vector of the object segment. In still another example, the canonical object may be selected based object metadata associated with the objects or object segments associated with the object cluster. Any other technique may be used to select the canonical object for the object cluster.

Linking a specific object from one scene to other scenes that include the same or similar objects provides a technical improvement over existing systems that match scenes or images based on an overall similarity between the two or more scenes or images. In particular, using traditional techniques, if a user is viewing a scene that includes multiple objects but the user is only interested in one particular object (or multiple objects), there currently exists no way for that user to select that particular object(s) from the scene and receive in response thereto other scenes that include that same or similar object, unless the entirety of both scenes are visually similar. In comparison, with the disclosed implementations, a user may select one or more query objects from a query scene and receive, in response thereto, matching scenes, which may be vastly visually different than the query scene from which the query object was selected, that also include that query object, or another object that is visually similar to the query object. For example, if a user is viewing a query scene of a party that includes several people in formal attire (e.g., dresses, suits, ties, jewelry, etc.) but the user is only interested in a particular high-heel shoe (query object) worn by one of the ladies in the scene, the user may select the particular high-heel shoe as a query object and receive, in response thereto, matching scenes that include that high-heel shoe, or a visually similar high-heel shoe. The matching scenes may be completely visually different than the query scene, other than also including a representation of the high-heel shoe or another visually similar high-heel shoe. For example, one or more of the matching scenes may be a product image that only includes the selected high-heel shoe, an image of just one person wearing the high-heel shoe and clothing that is completely different than the clothing worn by the person from the query scene wearing the high-heel shoe, etc.

In still other examples, in some implementations, object co-occurrence may be utilized with the disclosed implementations to determine and present matching scenes that have co-occurring objects to objects represented in a query scene viewed by a user, regardless of whether the user selects a query object from the query scene. In some implementations, the matching scenes may be ranked by the number of co-occurring objects and/or the arrangement of those objects with respect to the arrangement of the objects presented in the query scene.

As such, with the disclosed implementations, a user may select one or more query objects from a query scene and receive in response thereto other visually different matching scenes that also include the selected query object(s). The matching scenes may provide additional information to the user regarding the query object. Additional information may include, but is not limited to, other objects that pair well or are found in other scenes with the selected query object, other scene configurations that include the query object, etc. Alternatively, the user may view a query scene that includes objects and be presented other visually different matching scenes that include co-occurring objects to some of the objects represented in the query scene. The matching scenes allow the user to discern objects of a scene that are often found together in other scenes, the arrangement of those objects, etc.

While the discussion above with respect to FIG. 1 relates primarily to a user selecting a query object from a query scene, in some implementations, a user may select multiple query objects from one or more query scenes and the disclosed implementations will determine and present matching scenes that include the multiple selected query objects, or other objects that are visually similar to the query objects. For example, a user may select from a first query scene a first query object and a second query object. The disclosed implementations may then determine matching scenes to which both of those query objects are linked and present those matching scenes to the user. In another example, the user may select from a first query scene a first query object and select from a second query scene a second query object and the disclosed implementations may determine and return other matching scenes to which both the first query object and the second query object are linked.

Figure 2:
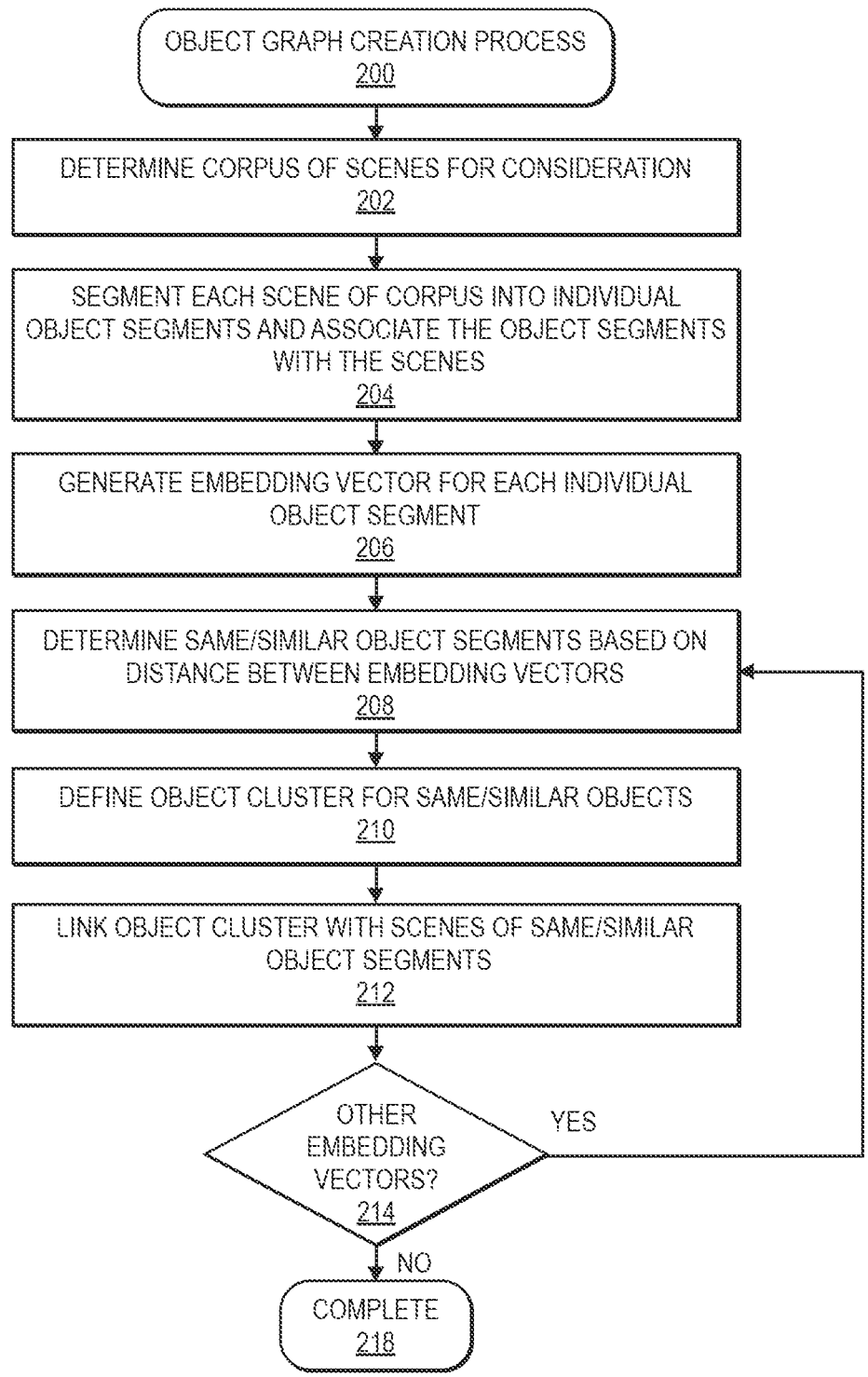
FIG. 2 is an example object graph creation process, in accordance with described implementations.

FIG. 2 is an example object graph creation process 200, in accordance with described implementations.

The example process 200 begins by determining a corpus of scenes for consideration, as in 202. The corpus of scenes may be any number, size, and/or type of scene. For example, a corpus may include all scenes accessible to the example process 200. In other implementations, the corpus may be a subset of all scenes accessible to the example process 200. For example, in some implementations, scenes may be grouped by type or relationship based on, for example, metadata included with the scene (e.g., words about the scene, geographic information about a location of the scene or where the scene was generated, date of creation of the scene, etc.). In still other examples, the example process 200 may be performed each time a new scene (e.g., digital image) is added so that the new scene can be linked to other scenes of the corpus.

Upon determining a corpus of scenes, each scene of the corpus is segmented, using one or more image processing algorithms, into individual object segments with each object represented in each scene segmented into a specific object segment, as in 204. As noted above, one or more image processing algorithms, deep neural networks, or CNNs, for example, may be used to identify objects included in each scene that are extracted into individual object segments.

Each object segment may also be processed to generate an embedding vector representative of that object segment, as in 206. For example, one or more embedding systems, Squeeze-and-Excitation Networks ("SENet"), etc., may be used to generate visual embedding vectors for each object segment.

In some implementations, prior to generating an embedding vector representative of the object segment, additional image processing may be performed. For example, in some implementations, one or more background subtraction algorithms may be performed to extract or remove image data corresponding to a background or other non-object pixels or data of the object segment. In such an implementation, the embedding vector may be even more representative of the object represented by the object segment because data of the object segment that does not directly relate to the object may be omitted or removed from consideration.

By way of definition and as those skilled in the art will appreciate, an "embedding vector" is an array of values that reflect aspects and features of source/input content. For example, an embedding vector of an object segment will include an array of values describing aspects and features of that object segment. A process, referred to as an embedding vector generator, that generates an embedding vector for input content uses the same learned features to identify and extract information, the results of which leads to the generation of the embedding vector. Embedding vectors generated by the same process on the same source content type are comparable such that a greater the similarity between the embedding vectors of two source items (e.g., object segments) indicates a greater similarity between the source items. By way of illustration and not limitation, an embedding vector may comprise 128 elements, each element represented by a 32- or 64-bit floating point value, each value representative of some aspect (or multiple aspects) of the input content. In other implementations, the embedding vector may have additional or fewer elements and each element may have additional or fewer floating-point values, integer values, and/or binary values.

Regarding embedding vector generators, typically an embedding vector generator accepts input content (e.g., an image, video, or multi-item content), processes the input content through various layers of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to a personal examination. However, collectively the elements of an embedding vector can be used to project or map the corresponding input content into an embedding space as defined by the embedding vectors.

As indicated above, two or more embedding vectors (generated from the same content type by the same embedding vector generator) may be compared for similarity as projected within the corresponding embedding space. The closer that two or more embedding vectors are located within the embedding space, the more similar the input content from which the embedding vectors were generated.

Once all object segments have been processed to generate respective embedding vectors, the same or similar object segments are determined based on a distance between the embedding vectors generated for the object segments, as in 208. As noted above, embedding vectors that represent the same/similar object segments will be close together in the embedding space. Objects determined to be the same or similar, based on the respective embedding vectors, may be clustered into an object cluster as representative of that object, as in 210. For example, embedding vectors within a defined distance of one another may be clustered into an object cluster. In another example, embedding vectors within a defined distance of an embedding vector and up to a defined number of embedding vectors may be clustered into an object cluster as representative of the same or similar object. For example, the top twenty-five embedding vectors that are closest in distance to a selected embedding vector may be selected as representative of the same or similar object. In other implementations, all embedding vectors within a defined distance of one another may be selected as representative of the same or similar object. In still other implementations, the example process 200 may consider both a defined number and distance for selecting embedding vectors of object segments that are determined to represent objects that are the same or similar. For example, the same or similar objects may be determined for a defined number of embedding vectors provided the defined number are within a defined distance of a selected embedding vector and/or within a defined distance of all other embedding vectors to be included in the object cluster. For example, the fifty closest embedding vectors that are all within a defined distance of one another may be included to form an object cluster.

Returning to FIG. 2, for each embedding vector determined to be included in an object cluster, a link is created between the object cluster and the scene that included the object segment used to generate the related embedding vector, as in 212. For example, if an object segment represented by an embedding vector is included in a cluster with twenty-five other object segments/embedding vectors from other scenes, there will be twenty-five links to the object cluster, one from each different scene.

In some implementations, a similarity score may be determined for each link between an object cluster and a scene. For example, the similarity score may be based at least in part on the distance between a representative embedding vector of the object cluster and the embedding vector representative of the object segment of the linked scene. For example, an embedding vector for an object cluster that is nearest a center of the object cluster in the embedding space may be selected as the representative embedding vector for the object cluster and similarity scores computed between that embedding vector and other embedding vectors of the object cluster (e.g., based on distance). As another example, a representative embedding vector may be formed that is an average or median of all the embedding vectors included in the object cluster.

Upon linking an object cluster to scenes that include an object segment associated with the cluster, the example process 200 may determine if there are other object segments to be processed and included in other object clusters, as in 214. If it is determined that other object segments remain to be processed, the example process returns to block 208 and continues.

If it is determined that no additional object segments remain for processing, the example process 200 completes, as in 218.

The example process 200 may be performed offline and the results stored in memory and utilized to determine scene and/or object relationships, provide responses or recommendations to client devices in response to selection of an object of interest by a user of a client device, to determine information and/or relationships about otherwise independent objects based on object co-occurrence between scenes, etc. Likewise, as additional scenes are added to the corpus, in some implementations, the example process 200 may be periodically performed again on all scenes of the corpus or just the newly added scenes to associate object segments of those new scenes with existing clusters (or to form new clusters) and to establish links between clusters and the new scenes.

As discussed, scenes, object segments, object clusters, links, and associations therebetween may be maintained in a memory and utilized to perform one or more of the disclosed implementations.

Figure 3:
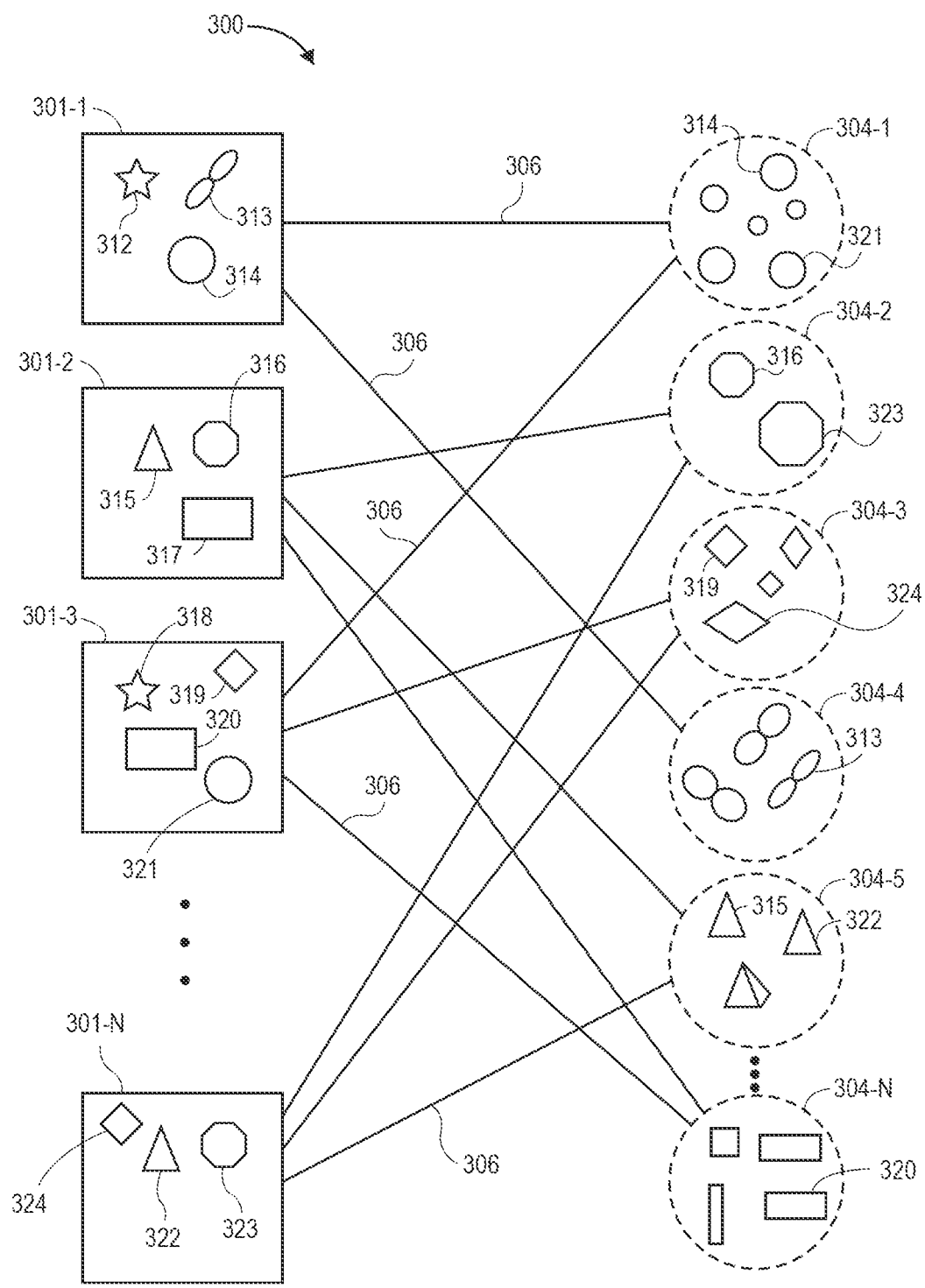
FIG. 3 is an example object graph illustrating links between objects and scenes, in accordance with described implementations.

FIG. 3 is an example object graph 300 illustrating links between objects and scenes, in accordance with described implementations.

In the illustrated example, the corpus of scenes may include a plurality of scenes 301-1, 301-2, 301-3, through 301-N. As will be appreciated, any number of scenes may be included in the corpus. As discussed above, object segments from each scene are extracted, embedding vectors are generated for those object segments, and the embedding vectors are used to form object clusters representative of the same/similar object segments. Scenes that include those object segments are linked to the corresponding object cluster. In the illustrated graph, the first scene 301-1 includes three object segments 312, 313, 314, the second scene includes object segments 315, 316, 317, the third scene includes object segments 318, 319, 320, 321, and the Nth scene includes object segments 322, 323, 324. Embedding vectors representative of each object segment 312-324 are generated and clustered to form object clusters 304-1, 304-2, 304-3, 304-4, 304-5, 304-N based on the distances between embedding vectors in an embedding space.

For example, the embedding vector for object segment 314 of scene 301-1 and the embedding vector for object segment 321 of scene 301-3 may be included in the same object cluster 304-1 and those scenes 301-1, 301-3 may be linked 306 to the object cluster 304-1. Likewise, the embedding vector for object segment 316 of scene 301-2 and the embedding vector for object segment 323 of scene 301-N may be included in the same object cluster 304-2 and the scenes 301-2, 301-N linked 306 to the object cluster 304-2. The embedding vector for object segment 319 from scene 301-3 and the embedding vector for object segment 324 from scene 301-N may be included in object cluster 304-3 and the scenes 301-3, 301-N linked 306 to the object cluster 304-3. The embedding vector for object segment 313 from scene 301-1 may be included in object cluster 304-4 and the scene 301-3 linked 306 with object cluster 304-4. The embedding vector for object segment 315 of scene 301-2 and the embedding vector for object segment 322 from scene 301-N may be included in object cluster 304-5 and the scenes 301-2, 301-N linked 306 to the object cluster 304-5. The embedding vector for object segment 317 of scene 301-2 and the embedding vector for object segment 320 of scene 301-3 may be included in object cluster 304-N and the scenes 301-2, 301-3 linked 306 to the cluster 304-N.

As can be seen from the example illustrated in FIG. 3, each scene may include multiple object segments and be linked to any number of object clusters, each object cluster corresponding to an object segment included in that scene. Utilizing the object graph 300, scenes with co-occurring objects can be efficiently determined. Likewise, if a query object or query scene is selected, the object graph 300 may be used to determine matching scenes that include that same or similar object(s).

While the example illustrated in FIG. 3 includes objects from scenes 301-1, 301-2, 301-3 through 301-N that are included in one of object clusters 304-1 through 304-N and the scenes linked to those object clusters, it will be appreciated that other object segments from those and/or other scenes may be processed and included in any of the clusters and links therebetween generated. For example, object segments 312 and 318 may be included in a cluster that is not represented in FIG. 3 and the scenes 301-1, 301-3 that include object segments 312, 318 may be linked to that object cluster. Accordingly, it will be appreciated that such additional object segments from scenes, object clusters, and/or links between object clusters and scenes that are not illustrated in FIG. 3 are equally contemplated by the disclosed implementations.

Figure 4:
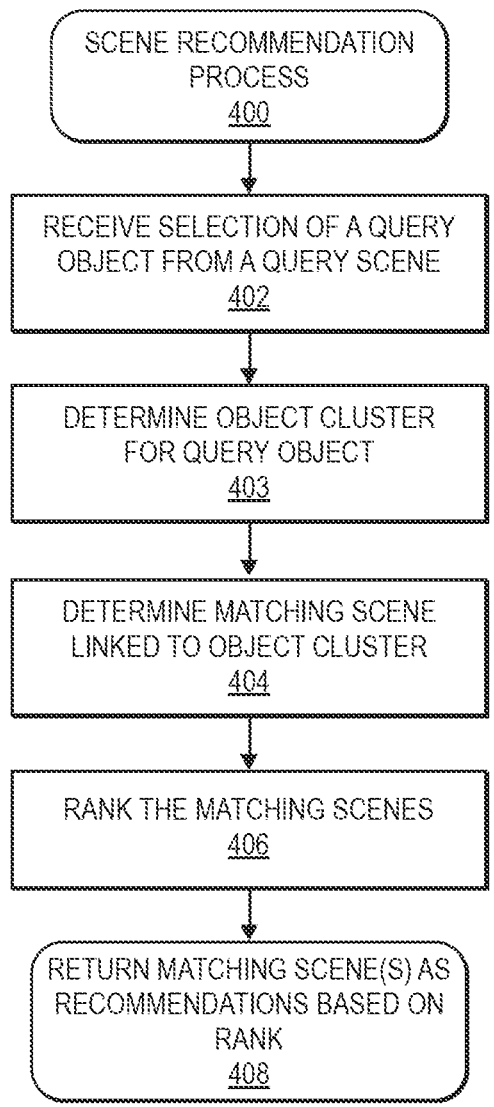
FIG. 4 is an example matching scene recommendation process, in accordance with described implementations.

FIG. 4 is an example matching scene recommendation process 400, in accordance with described implementations.

The example process 400 begins upon receipt of a query object represented in a first scene, as in 402. Selection of a query object may be performed in any of a variety of manners. For example, a user may physically select a query object from a query scene the user is viewing on a display of a client device (e.g., cell phone, tablet, laptop computer, desktop computer, etc.). In other implementations, selection of a query object may be inferred based on a user's browse history, gaze tracking of the user's pupils, comments or annotations provided by the user, etc.

Upon receipt of a selection of a query object, a determination is made as to the object cluster with which the selected query object is associated, as in 403. For example, as discussed above, the embedding vector representative of a query object from a scene may be included in an object cluster. That object cluster and/or embedding vector may be associated with the object of the scene and the association maintained in a memory.

Based on the object cluster, other scenes that are linked to the object cluster are determined as matching scenes, as in 404. As discussed above, embedding vectors that are within a defined distance are determined to represent the same/similar object segments, are clustered, and scenes that include those object segments linked to the object cluster.

The matching scenes determined to be linked to the object cluster may then be ranked, as in 406. For example, a similarity score may be determined for each matching scene linked to the object cluster based at least in part on a distance between the embedding vector of the selected query object and the embedding vector corresponding to the matching scene, with scenes having embedding vectors closer to the embedding vector of the query object receiving a higher score. In other examples, the similarity score may be determined based on a distance between the embedding vector of an object segment from a matching scene and a representative embedding vector, as discussed above.

In some implementations, as discussed further below, it may also be determined if there are other objects represented in the query scene that are also linked to object clusters that are linked to matching scenes linked to the object cluster corresponding to the query object and the ranking and/or similarity scores of those linked scenes increased or decreased respectively. For example, if a matching scene is also linked to another object cluster that corresponds to another object segment of the query scene, the similarity score for that matching scene may be increased if similar scenes are desired or decreased is dis-similar scenes are desired, both of which include the selected object of interest. In some implementations, it may further be determined if the number of objects of the query scene included in a matching scene exceeds a threshold, the matching scene may be discarded. A matching scene that includes multiple links with objects from the query scene may be indicative that the matching scene and the query scene are the same scene.

Returning to FIG. 4, one or more of the highest ranked matching scenes that are linked to the object cluster corresponding to the selected query object are then returned to the client device for presentation by the client device, as in 408. In some implementations, only the top ranked matching scene is returned for presentation. In other implementations, all matching scenes may be returned to the client device for presentation in the ranked order. In still other examples, the display space and/or capabilities of the client device may be determined and a portion of the matching scenes, e.g., the top ten percent of the matching scenes sent to the client device for presentation.

Figure 5:
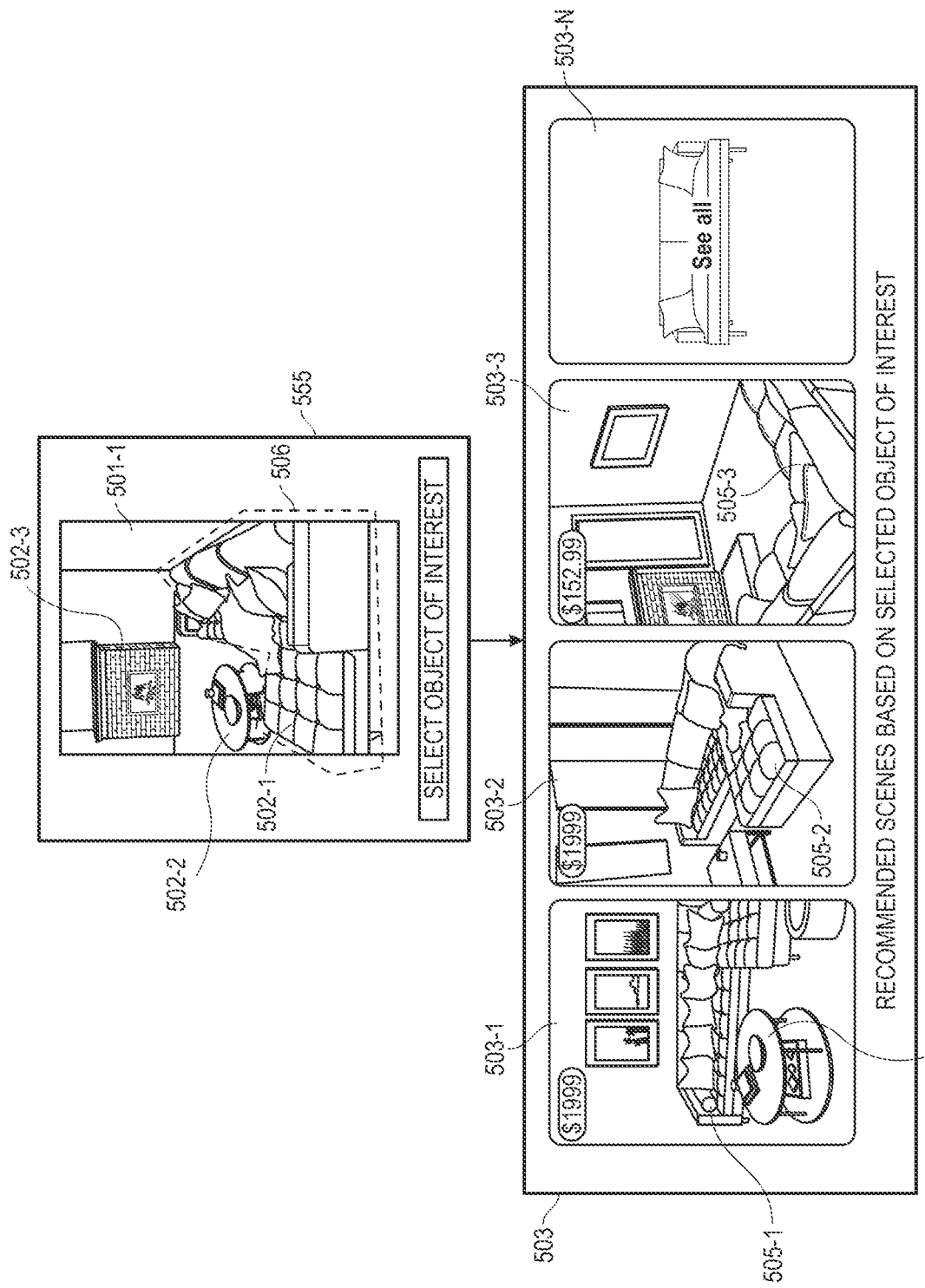
FIG. 5 is an example user interface to select a query object from a query scene and receipt of recommended matching scenes based on the example matching scene recommendation process of FIG. 4, in accordance with described implementations.

FIG. 5 is an example of a series of user interfaces that may be presented on a client device to enable selection of a query object 502-1 from a query scene 501-1 and subsequent presentation of one or more recommended matching scenes 503 that also include the query object, or a visually similar version of the query object, in accordance with described implementations.

As discussed above and as illustrated in FIG. 5, a user of a client device may be presented a query scene 501-1, on a display 555 of the client device, that includes a plurality of objects, such as a couch object 502-1, a table object 502-2, and a fireplace object 502-3. The user, through interaction with the client device, may select one or more of the objects as a query object. In the illustrated example, the user has selected the couch object 502-1 as an object of interest, as illustrated by dashed lines 506, from the scene 501-1.

As discussed above, one or more matching scenes that are linked to the selected query object 502-1, via the object cluster with which the selected query object corresponds, may be determined, optionally ranked, and one or more of those matching scenes returned to the client device for presentation to the user as recommended matching scenes that include the selected query object, or a visually similar object. In the illustrated example, based on the selection of the couch object 502-1 as the query object, three scenes 503-1, 503-2, 503-3, and a link 503-N to optionally see all matching scenes are returned for presentation to the user. Each of the returned scenes 503, in the illustrated example, include the same or visually similar object as the query object but the matching scene itself may be visually different than the query scene 501-1 from which the query object was selected.

For example, each of the scenes 503-1, 503-2, and 503-3 include the same or similar object of a couch, as illustrated by couch object 505-1 in scene 503-1, couch object 505-2 in scene 503-2, and couch object 505-3 in scene 503-3. In addition, the scenes that are linked to the query object are also ranked and presented in a ranked order. For example, matching scene 503-1 may receive a highest ranking because the embedding vector for the query object, the couch object 502-1, is closest to the embedding vector for the couch object 505-1 in matching scene 503-1 and because there is another object from the query scene 501-1 that is also linked to the matching scene 503-1, namely the table object 502-2 which is determined to be the same object as table object 506-2. The second scene 503-2 is assigned a second rank with respect to the query object because of the distance between the embedding vector of the query object and the embedding vector of the object 505-2 of the second matching scene 503-2. Finally, the third scene, while it may be determined to include two links from objects of the query scene, specifically the couch object 502-1 and the fireplace object 502-3, it may be ranked lower than the second matching scene due to the distance between the embedding vector of the query object 502-1 and the embedding vector of the couch object 505-3 of the third matching scene.

As illustrated in FIG. 5, the disclosed implementations allow a user to select a query object from a query scene and receive, for example, matching scenes that may be visually different than the query scene that also include the same or similar object as the selected query object. By viewing other, different matching scenes that also include the query object, or a visually similar object, the user is able to explore and experience the query object when presented in different environments, with different objects, in different configurations, etc., and thereby gain a better understanding and appreciation of the selected query object.

Figure 6:
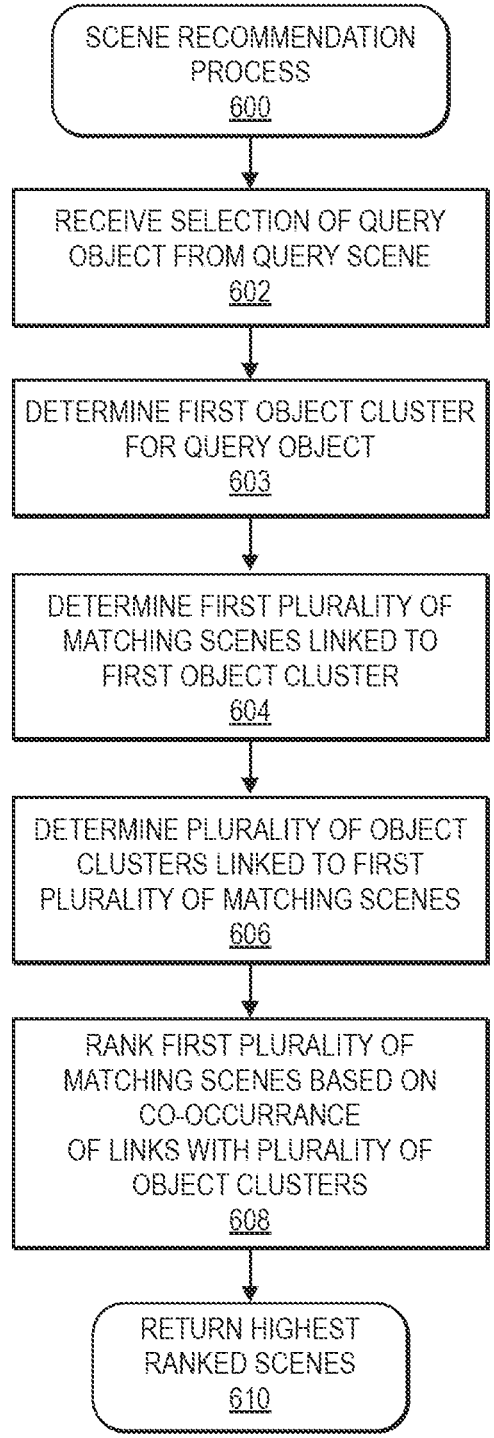
FIG. 6 is an example matching scene recommendation process, in accordance with described implementations.

FIG. 6 is an example scene recommendation process 600, in accordance with described implementations.

The example process 600 begins upon receipt of a query object represented in a query scene, as in 602. Selection of a query object may be performed in any of a variety of manners. For example, a user may physically select a query object from a query scene the user is viewing on a display of a client device (e.g., cell phone, tablet, laptop computer, desktop computer, etc.). In other implementations, selection of a query object may be inferred based on a user's browse history, gaze tracking of the user's pupils, comments or annotations provided by the user, etc.

Upon receipt of a selection of a query object, a determination is made as to the object cluster, referred to in this example as the first object cluster, with which the selected query object is associated, as in 603. For example, as discussed above, the embedding vector representative of an object segment from a scene may be included in an object cluster. That object cluster and/or embedding vector may be associated with the object of the scene and the association maintained in a memory.

A determination is then made to identify a first plurality of matching scenes that are linked to the first object cluster, as in 604. As discussed above, if a scene includes an object for which the representative embedding vector is included in the object cluster, the scene is linked to the object cluster and thus, a matching scene.

For each of the first plurality of matching scenes determined to be linked to the first object cluster, a determination is made as to a plurality of object clusters that are linked to one or more of those first plurality of matching scenes, as in 606. The first plurality of matching scenes may then be ranked based on the number of co-occurring links to object clusters of the plurality of clusters, as in 608. For example, a matching scene with a highest number of links to different object clusters of the plurality of object clusters may receive a highest rank as that scene includes the highest number of co-occurring objects, in addition to the query object.

Finally, the example process 600 returns to the client device the highest ranked scenes as recommended scenes responsive to the query object and illustrative of scenes that include the query object and other objects that frequently co-occur in scenes with the query object, as in 610.

Figure 7A:
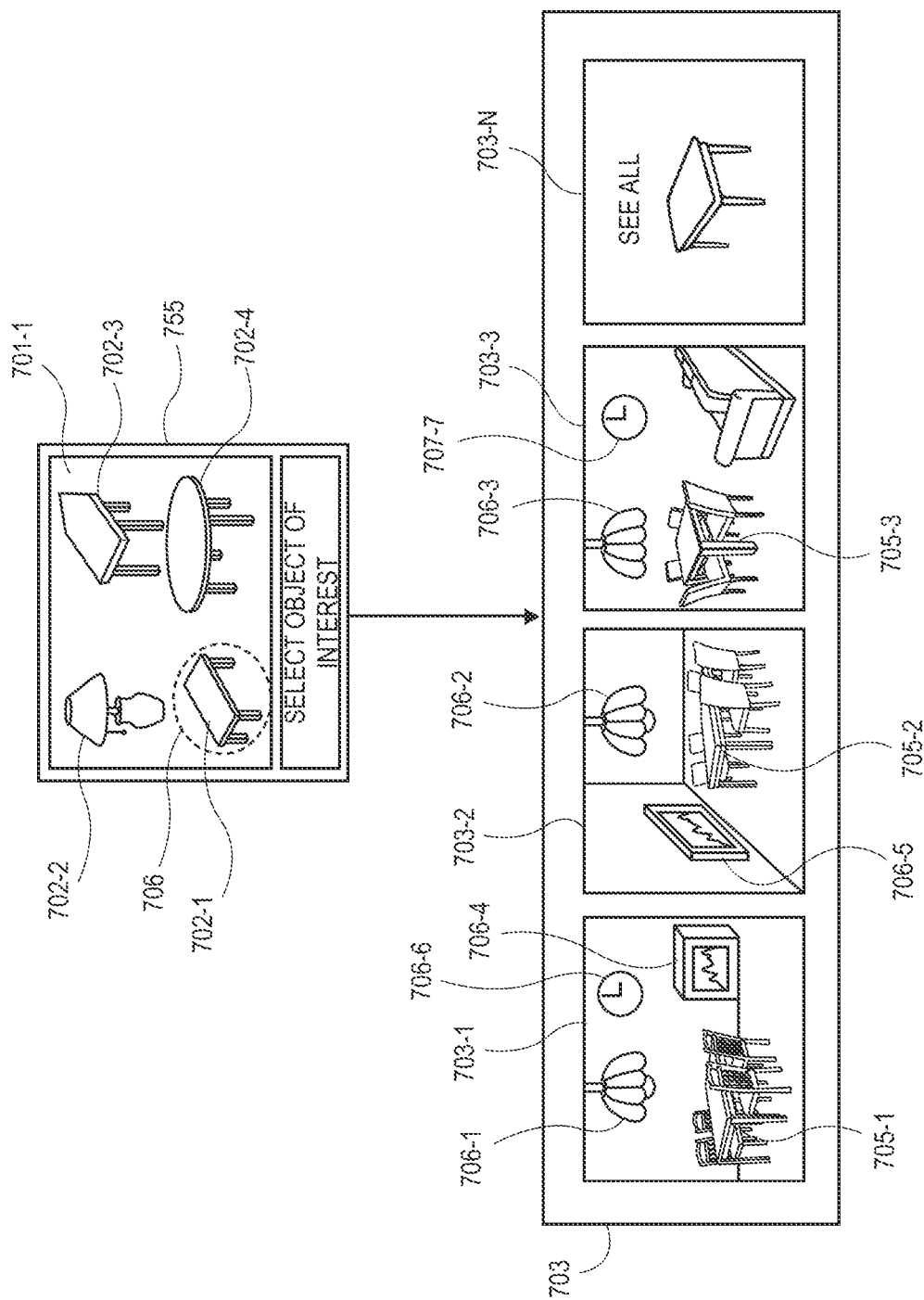
FIG. 7A is an example user interface to select a query object from a query scene and receipt of recommended matching scenes based on the example matching scene recommendation process of FIG. 6, in accordance with described implementations.

FIG. 7A is an example user interface to select a query object from a query scene and receipt of recommended matching scenes based on the example matching scene recommendation process of FIG. 6, in accordance with described implementations.

As discussed above and as illustrated in FIG. 7A, a user of a client device may be presented a query scene 701-1, on a display 755 of the client device, that includes a plurality of objects, such as a rectangle table object 702-1, a lamp object 702-2, an odd shape table object 702-3, and a round table object 702-4. The user, through interaction with the client device, may select one or more of the objects as a query object. In the illustrated example, the user has selected the rectangle table object 702-1 as a query object, as illustrated by dashed lines 706, from the scene 701-1.

Figure 7B:
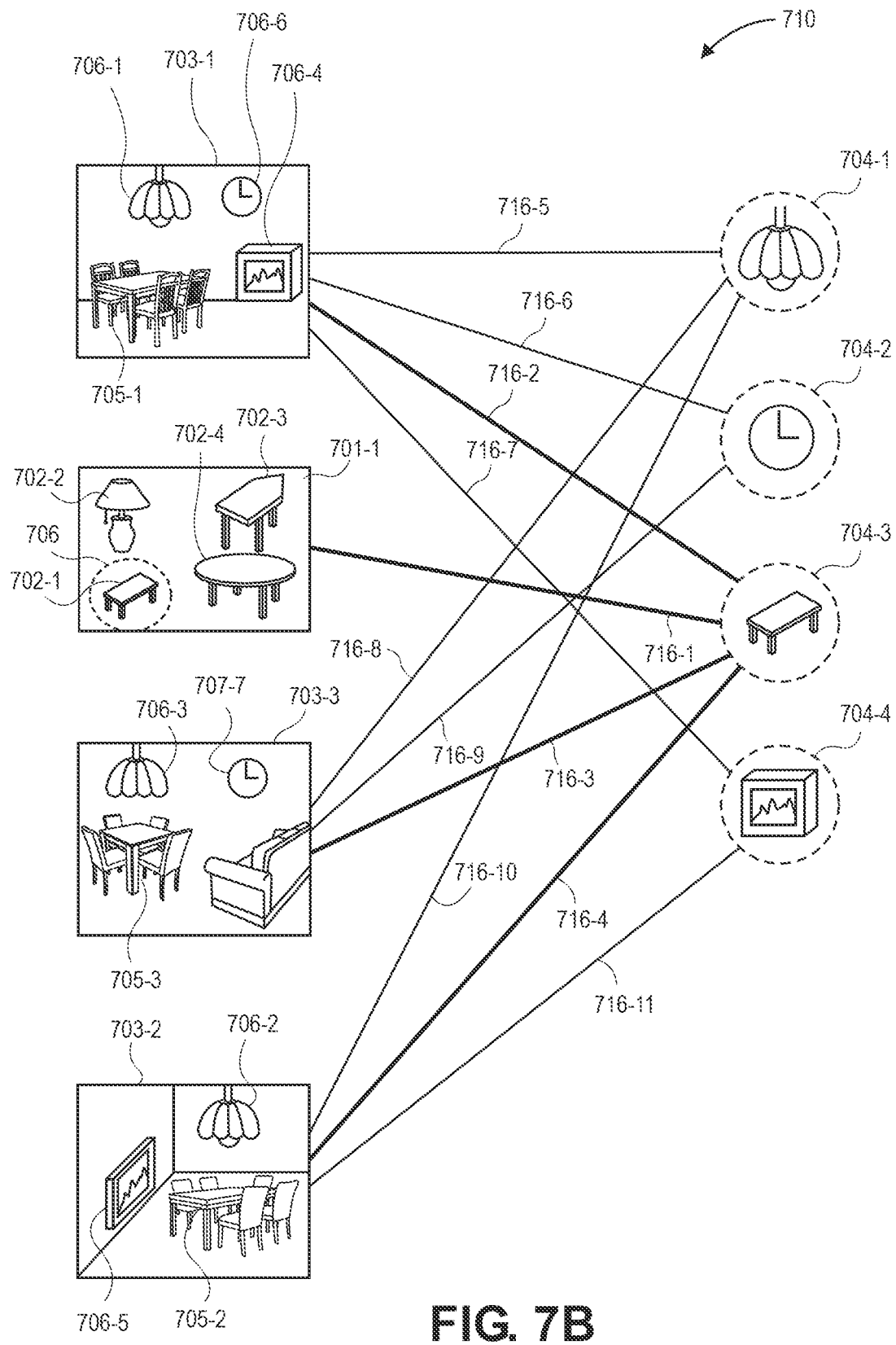
FIGS. 7B and 7C are example object graphs corresponding to the example illustrated in FIG. 7A, in accordance with described implementations.
Figure 7C:
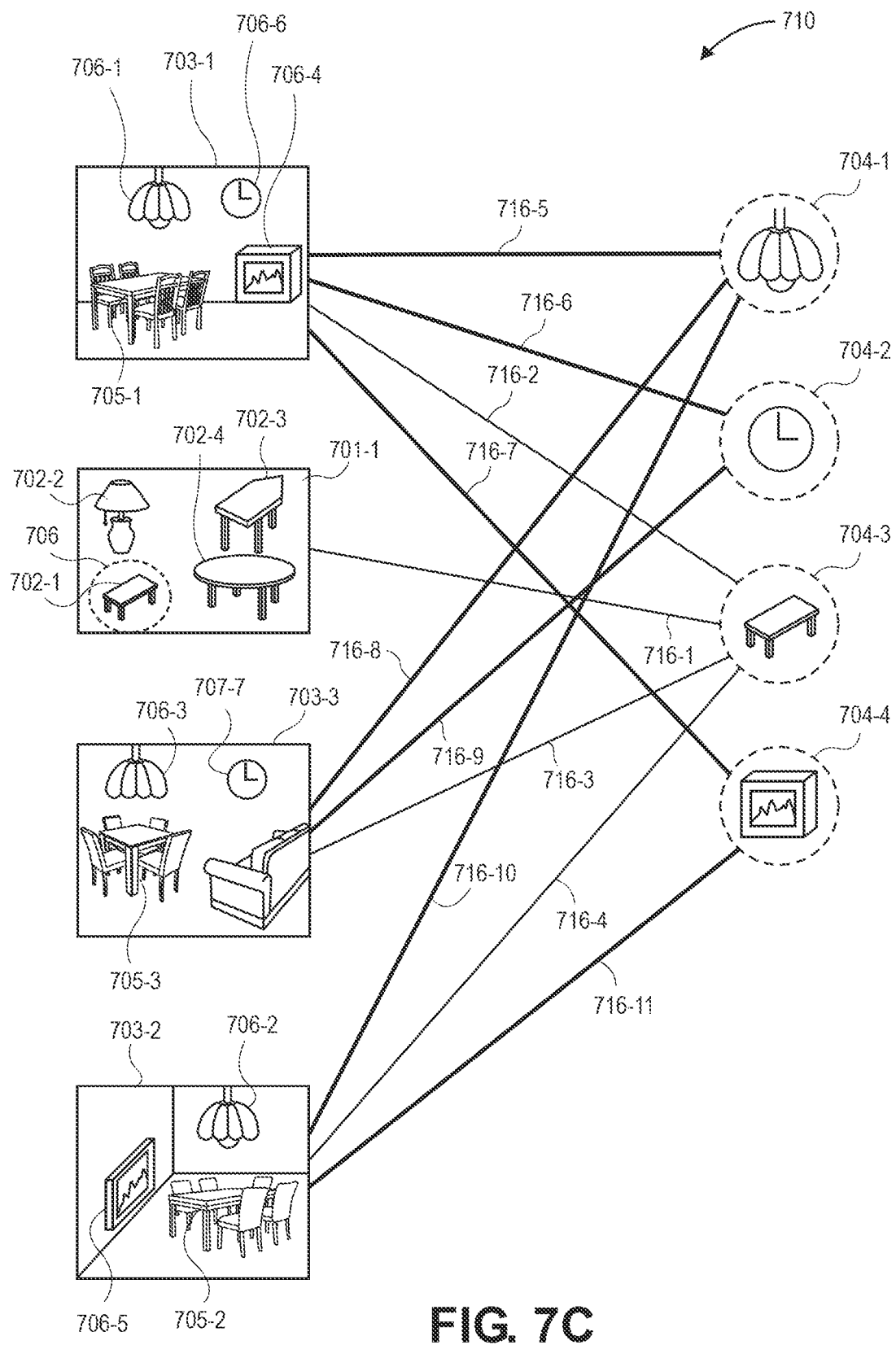

As discussed above with respect to FIG. 6, a first plurality of matching scenes that are linked to the same object cluster to which the query object is linked may be determined, other co-occurring object clusters linked to those matching scenes determined, the plurality of matching scenes ranked based on the co-occurrence, and one or more of those ranked matching scenes returned to the client device for presentation to the user as recommended matching scenes that include the selected query object (or a visually similar object) and other objects that often appear with the selected query object. In the illustrated example, based on the selection of the rectangle table object 702-1 as the query object, as illustrated by dashed lines 706, three scenes 703-1, 703-2, 703-3 are returned for presentation to the user as recommended scenes 703 and a user may select to view all 703-N matching scenes. For example and referring to FIG. 7B, based on the object graph 710 it can be determined that the selected query object 702-1 is part of object cluster 704-3, as illustrated by link 716-1 and that each of scenes 703-1, 703-2, and 703-3 are linked to object cluster 704-3, as illustrated by links 716-2, 716-3, 716-4, because they also include table objects 705-1, 705-2, 705-3, and are therefore matching scenes. In this example, once the matching scenes 703-1, 703-2, 703-3 are determined, it may be determined the number of co-occurring objects in each of those matching scenes and the matching scenes may be ranked based on the quantity of co-occurring objects in those matching scenes. For example, and referring to FIG. 7C, it can be determined that matching scene 703-1 is also linked to object cluster 704-1 via link 716-5 because it includes a lamp object 706-1, object cluster 704-2 via link 716-6 because it includes clock object 706-6, and object cluster 704-4 via link 716-7 because it includes fireplace object 706-4. Scene 703-3 is linked to object cluster 704-1 via link 716-8 because it includes lamp object 706-3, and object cluster 704-2 via link 716-9 because it includes clock object 707-7. Matching scene 703-2 is linked to object cluster 704-1 via link 716-10 because it includes lamp object 706-2 and linked to object cluster 704-4 via link 716-11 because it includes fireplace object 706-5. Based on the links to the co-occurring objects, the scenes can be ranked based on the number of co-occurrences. In this example, matching scene 703-1 is assigned the highest rank with three co-occurring objects, represented as object clusters 704-1, 704-2, 704-4. The other two matching scenes 703-2, 703-3 are assigned a lower rank as they each only have two other co-occurring objects.

Referring back to FIG. 7A, the matching scenes are presented in ranked order, with the matching scene having the highest number of co-occurring objects, in addition to the same or similar object as the query object, presented first. As illustrated, each of the returned matching scenes 703 may be very different than the query scene 701-1, but all include the same or visually similar object as the selected query object 702-1.

As illustrated, the disclosed implementations allow users to select a query object from a scene and receive, for example, matching scenes that may be visually different than the query scene that also include the same or similar object as the selected query object and further include other objects that frequently co-occur in scenes with the query object (or a visually similar object). By viewing other, different scenes that also include the object of interest and other co-occurring objects, the user is able to explore and experience the object when presented in different environments, with different objects, in different configurations, etc., and thereby gain a better understanding and appreciation of the selected query object.

Figure 8:
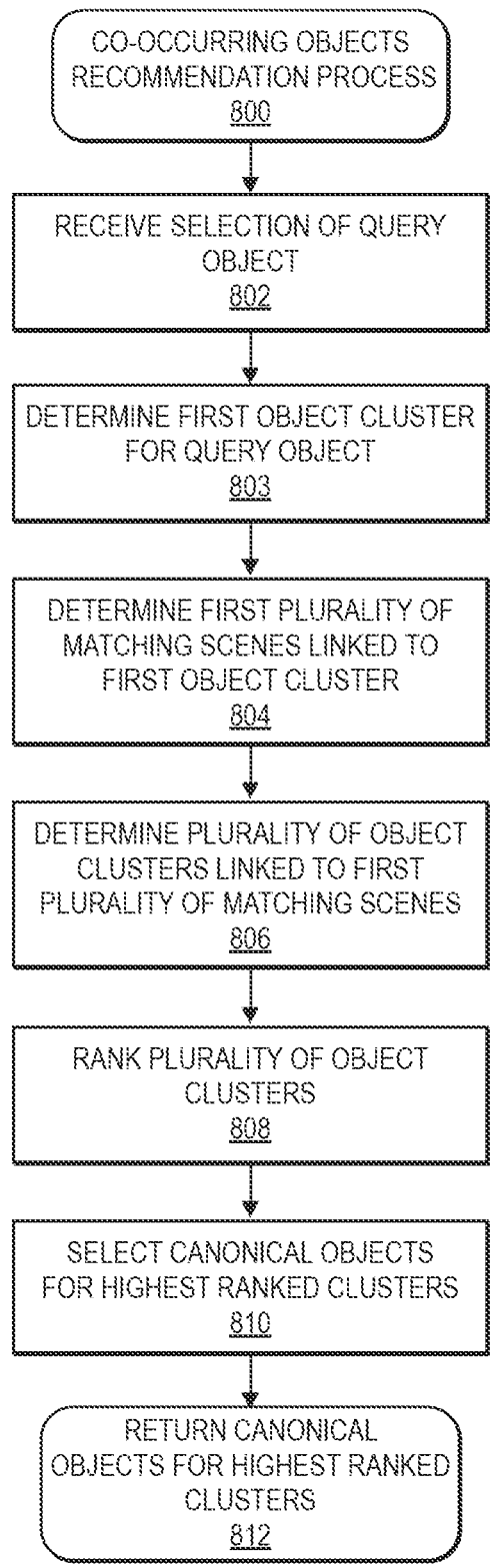
FIG. 8 is an example matching scene recommendation process, in accordance with described implementations.

FIG. 8 is an example co-occurring object recommendation process 800, in accordance with described implementations.

The example process 800 begins upon receipt of a query object, as in 802. Selection of a query object may be performed in any of a variety of manners. For example, a user may physically select a query object from a query scene the user is viewing on a display of a client device (e.g., cell phone, tablet, laptop computer, desktop computer, etc.) and/or the user may be viewing an image that only includes the query object. In other implementations, selection of a query object may be inferred based on a user's browse history, gaze tracking of the user's pupils, comments or annotations provided by the user, etc.

Upon receipt of a selection of a query object, a determination is made as to the object cluster, referred to in this example as the first object cluster, with which the selected query object is associated, as in 803. For example, as discussed above, the embedding vector representative of an object may be included in an object cluster.

A determination is then made to identify a first plurality of matching scenes that are linked to the first object cluster, as in 804. As discussed above, if a scene includes an object for which the representative embedding vector is included in the object cluster, the scene is linked to the object cluster and thus, a matching scene.

For each of the first plurality of matching scenes determined to be linked to the first object cluster, a determination is made as to a plurality of object clusters that are linked to one or more of those first plurality of matching scenes, as in 806. The plurality of object clusters may then be ranked based on the number of links from scenes that also include the query object or an object that is visually similar to the query object, as in 808. For example, a cluster with the highest number of links from scenes that also include the query object may receive a highest rank as the object represented by that cluster co-occurs in scenes most frequently with the query object.

For at least some of the clusters, such as the highest ranked clusters, a canonical object corresponding to or representative of that cluster may then be selected, as in 810. Finally, some or all of the canonical objects are returned to the client device for presentation as objects that frequently co-occur in scenes with the query object, as in 812.

Figure 9A:
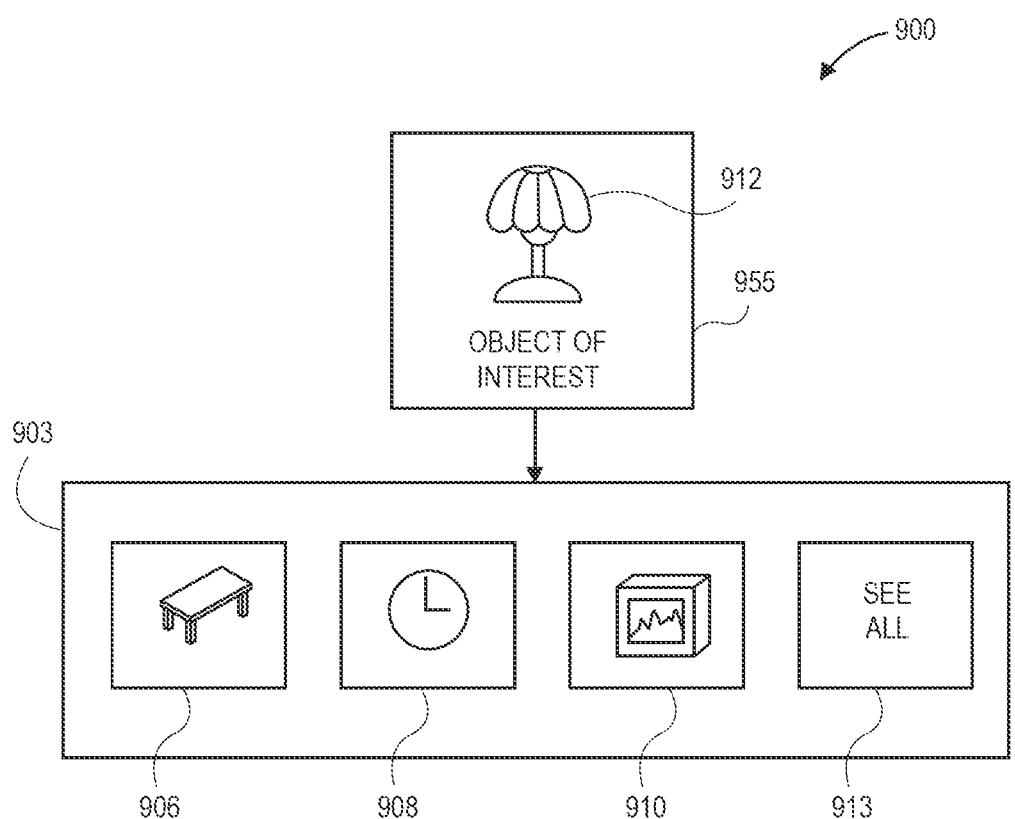
FIG. 9A is an example user interface to select a query object and receipt of recommended matching objects based on the example co-occurring object recommendation process of FIG. 8, in accordance with described implementations.

FIG. 9A is an example user interface 900 to select a query object 912 and receipt of recommended objects 903 that frequently co-occur with the query object, determined based on the example co-occurring object recommendation process of FIG. 8, in accordance with described implementations.

As discussed above and as illustrated in FIG. 9A, a user of a client device may be presented or select a query object that is presented on a display 955 of a client device, such as the lamp object 912.

As discussed above with respect to FIG. 8, a first plurality of matching scenes that are linked to the same object cluster to which the query object is linked may be determined, other co-occurring object clusters linked to those matching scenes determined, the clusters ranked based on the number of links from scenes linked to the cluster associated with the query object, and canonical objects corresponding to the highest ranked clusters returned as recommended objects that frequently co-occur with the query object. In the illustrated example, based on the selection of the lamp object 912 as the query object, three co-occurring objects 906, 908, and 910 are returned for presentation to the user. In addition, a user may select the see all option 913 to view all determined co-occurring objects. Of particular note, other than the objects co-occurring in scenes with the query object, which is derived from the object graph, there may be no other relationship between the query object and the recommended co-occurring objects 903.

Figure 9B:
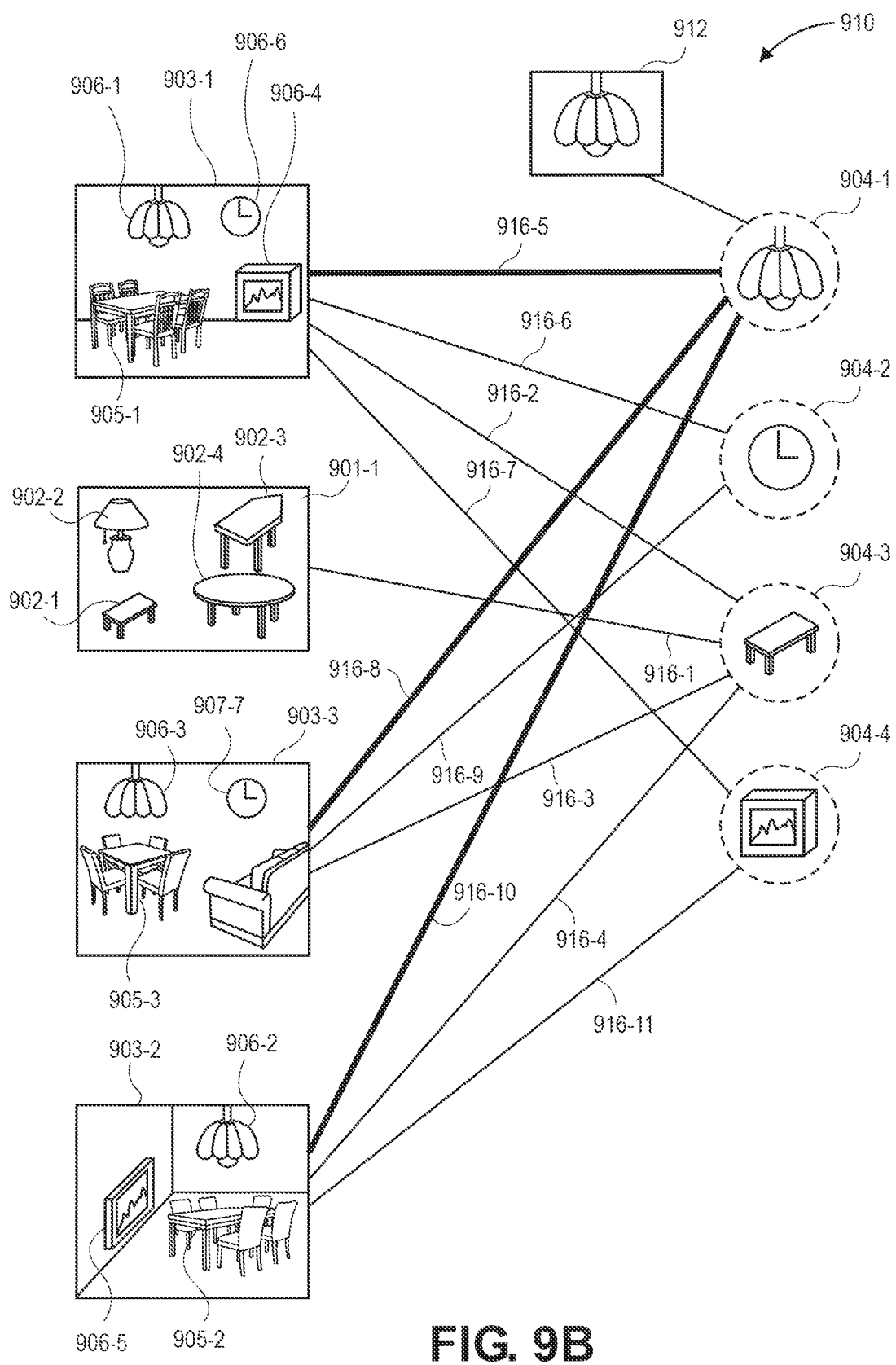
FIGS. 9B and 9C are example object graphs corresponding to the example illustrated in FIG. 8A, in accordance with described implementations.
Figure 9C:
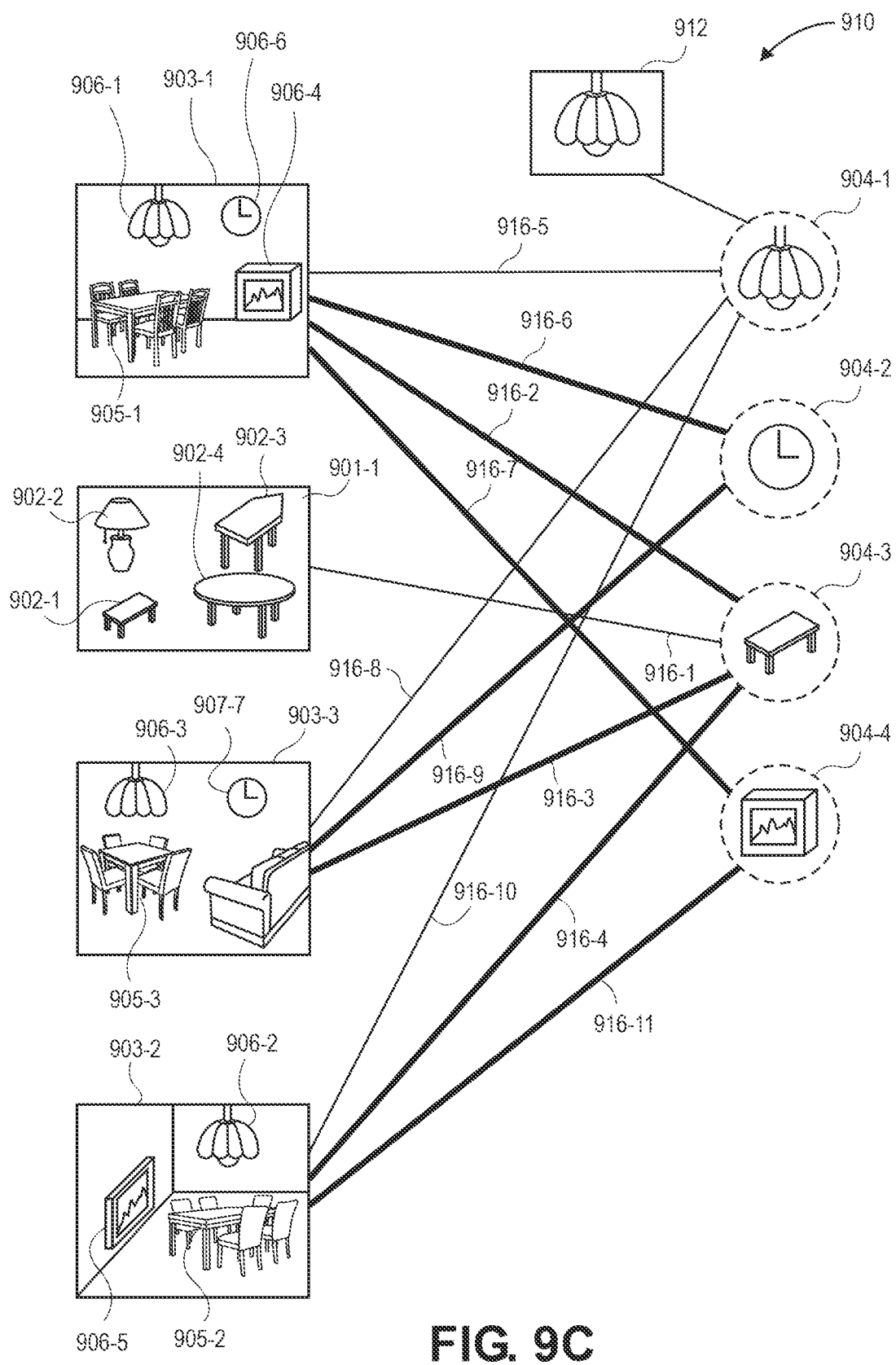

Referring to FIG. 9B, based on the object graph 910 it can be determined that the selected query object 912 is part of object cluster 904-1, and that each of scenes 903-1, 903-2, and 903-3 are linked to object cluster 904-1, as illustrated by links 916-5, 916-8, 916-10 and are therefore scenes that also include the query object or an object that is visually similar to the query object. For example, scene 903-1 includes lamp object 906-1, scene 903-2 includes lamp object 906-2, and scene 903-3 includes lamp object 906-3, each of which are associated with object cluster 904-1. In this example, once the matching scenes 903-1, 903-2, 903-3 are determined, it may be determined what other object clusters are also linked to those scenes. For example, and referring to FIG. 9C, it can be determined that matching scene 903-1 is also linked to object cluster 904-2 via link 916-6 because it includes clock object 906-6, object cluster 904-3 via link 916-2 because it includes table object 905-1, and object cluster 904-4 via link 916-7 because it includes fireplace object 906-4. Scene 903-2 is also linked to object cluster 904-3 via link 916-4 because it includes table object 905-2 and linked to object cluster 904-4 via link 916-11 because it includes fireplace object 906-5. Matching scene 903-3 is linked to object cluster 904-2 via link 916-9 because it includes clock object 907-7 and linked to object cluster 904-3 via link 916-3 because it includes table object 905-3. The object clusters 904-2, 904-3, 904-4, that are linked to scenes that are also linked to the object cluster 904-1 that corresponds to the query object may also be ranked based on the number of links from matching scenes 903-1, 903-2, 903-3. The higher the number of links from matching scenes the higher the co-occurrence of the query object and the object represented by the cluster. In this example, object cluster 904-3, representative of the table object, is assigned the highest rank because it has three links 916-2, 916-3, and 916-4 from matching scenes. Object clusters 904-2 and 904-4 are assigned a lower rank because they have fewer links from matching scenes. In comparison, scene 901-1, the objects 902-1, 902-2, 902-3, 902-4 included in that scene 901-1, and the link 916-1 from that scene to object cluster 904-3 are not considered because scene 901-1 does not include the query object 912 or an object that is visually similar to the query object 912.

Referring back to FIG. 9A, the canonical objects representative of the clusters are presented in ranked order, with the canonical object representative of the cluster with the highest number of links, and thus representative of the object that most frequently co-occurs in scenes with the query object, presented first. As illustrated, each of the returned co-occurring objects 903 may be completely unrelated to the query object, other than they are determined from the object graph to co-occur in scenes with the query object 912.

As illustrated, the disclosed implementations allow users to select a query object and receive, for example, representations of other objects that are determined to frequently co-occur in scenes with the query object (or objects that are visually similar to the query object). By viewing other objects that frequently co-occur in scenes with the query object but may be otherwise unrelated to the query object, the user is able to explore and experience other objects that may be complimentary or pair well with the query object and thereby gain a better understanding of the query object and/or the co-occurring objects.

Figure 10:
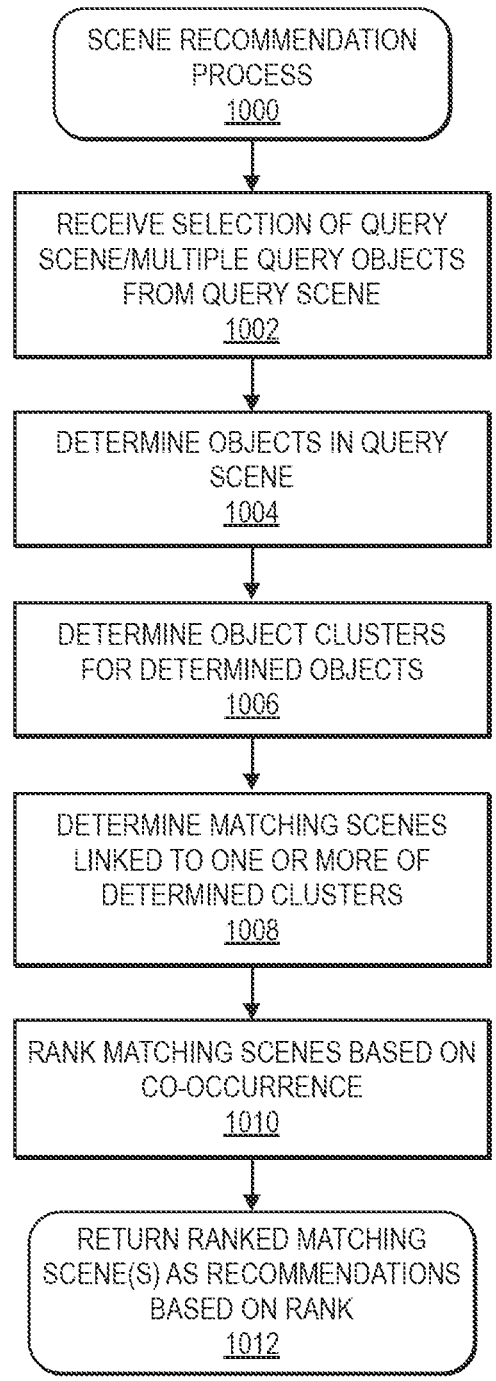
FIG. 10 is an example matching scene recommendation process, in accordance with described implementations.

FIG. 10 is an example scene recommendation process 1000, in accordance with described implementations.

The example process 1000 begins upon receipt of a selection of a query scene or a selection of multiple query objects represented in the query scene, as in 1002. Depending on the implementation, the example process may utilize specific query objects selected from a query scene or all objects detected in a query scene. Selection of a query object may be performed in any of a variety of manners. For example, a user may physically select a query object from a query scene the user is viewing on a display of a client device (e.g., cell phone, tablet, laptop computer, desktop computer, etc.). In other implementations, selection of a query object may be inferred based on a user's browse history, gaze tracking of the user's pupils, comments or annotations provided by the user, etc.

Upon receipt of a selection of a query object or selection/viewing of a query scene, a determination is made as to the objects included in the scene, as in 1004. Object clusters corresponding to the selected query objects and/or determined objects from the selected scene are likewise determined, as in 1006. For example, as discussed above, the embedding vectors representative of the various selected query objects or objects from the query scene may be included in different object clusters, each object cluster including embedding vectors that are close in distance in the embedding space, as discussed above. For example, if there are three objects in the query scene (or three selected query objects), each object may be associated with different object clusters.

Based on the determined object clusters, matching scenes that are also linked to one or more of the determined object clusters are determined, as in 1008. The matching scenes may then be ranked based on the number of co-occurring objects with the query objects or objects from the query scene, as in 1010. For example, if there are four object clusters corresponding to four object segments from the query scene (or four query objects) a matching scene that is linked to each of the four object clusters will have a higher rank than a scene that is linked to less than four of the object clusters.

Finally, one or more of the highest ranked matching scenes are then returned to the client device for presentation by the client device, as in 1012. In some implementations, only the top ranked matching scene is returned for presentation. In other implementations, all matching scenes may be returned to the client device for presentation in the ranked order. In still other examples, the display space and/or capabilities of the client device may be determined and a portion of the matching scenes, e.g., the top ten percent of the matching scenes sent to the client device for presentation.

Figure 11A:
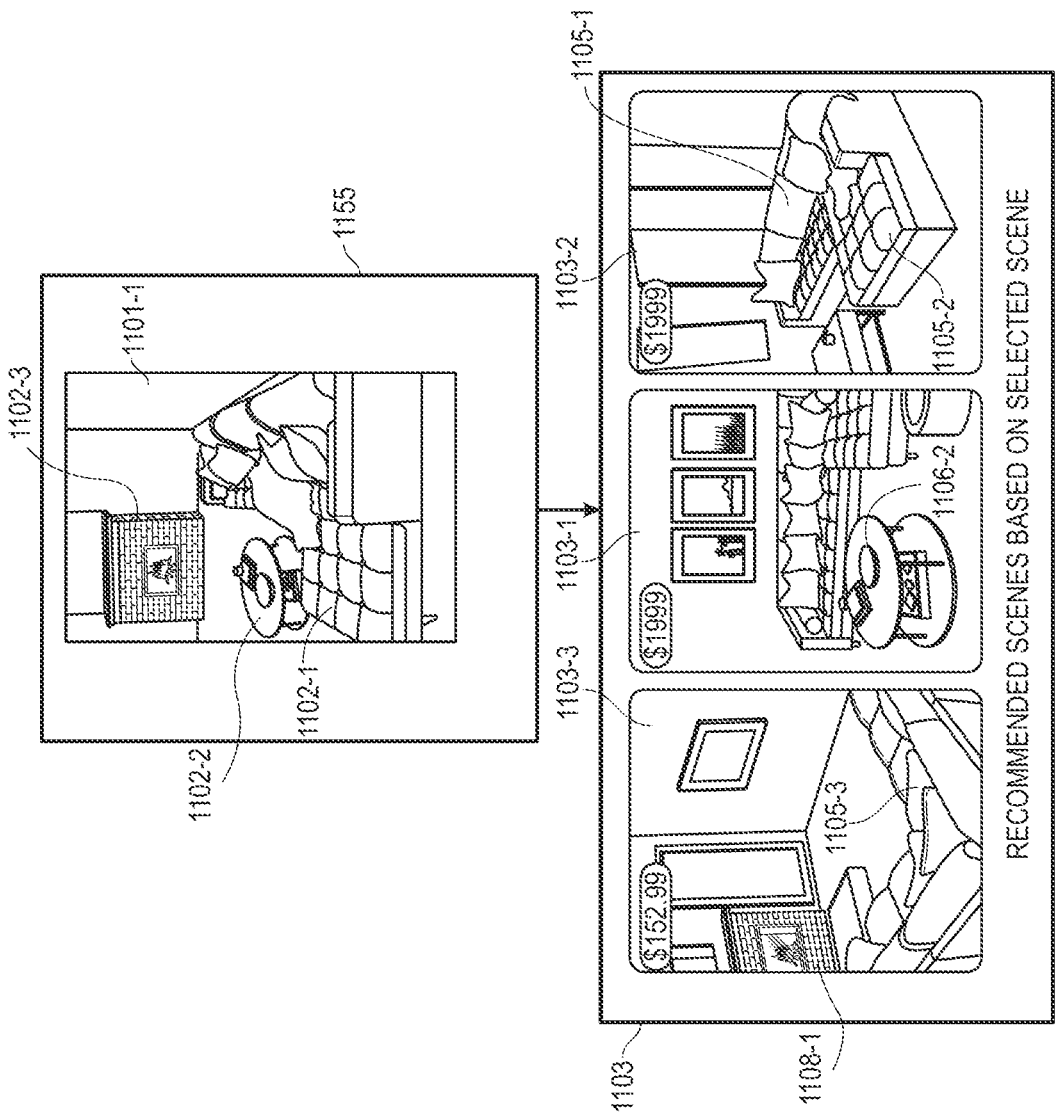
FIG. 11A is an example user interface to select a query scene and receipt of recommended matching scenes based on the example matching scene recommendation process of FIG. 10, in accordance with described implementations.

FIG. 11A is an example user interface to select a query scene and receipt of recommended matching scenes 1103 based on the example matching scene recommendation process of FIG. 10, in accordance with described implementations. While the example discussed with respect to FIG. 11A relates to selection of a query scene, the implementations are equally applicable to selection of multiple query objects from a query scene.

As discussed above and as illustrated in FIG. 11A, a user of a client device may be presented a query scene 1101-1, on a display 1155 of the client device, that includes a plurality of objects, such as a couch object 1102-1, a table object 1102-2, and a fireplace object 1102-3.

As discussed above with respect to FIG. 10, object clusters linked to the query scene based on the objects/object segments included in the scene are determined. In addition, matching scenes 1103-3, 1103-1, 1103-2 that are also linked to those object clusters are determined and then ranked based on the number of co-occurring objects in the matching scene that are also in the selected query scene 1101-1. In the illustrated example, based on the selection of the query scene 1101-1, three matching scenes 1103-1, 1103-2, 1103-3 are returned for presentation to the user.

Figure 11B:
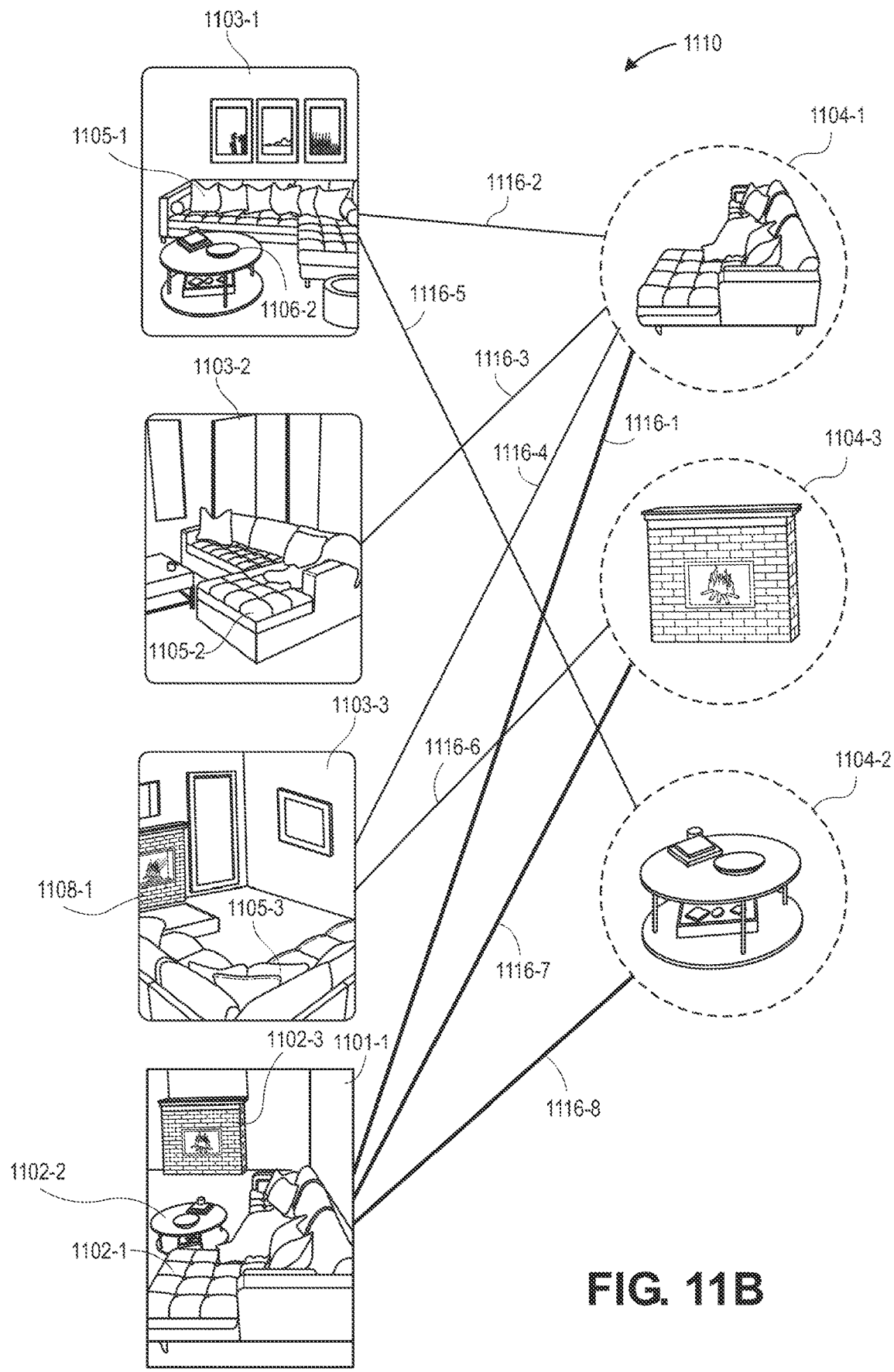
FIG. 11B is an example object graph corresponding to the example illustrated in FIG. 11A, in accordance with described implementations.

Referring to FIG. 11B, which illustrates an example object graph 1110 corresponding to FIG. 11A, it is determined that the scene 1101-1 is linked to object clusters 1104-1, 1104-2, 1104-3, as illustrated by links 1116-1, 1116-7, 1116-8. From those linked object clusters, it can also be determined that scenes 1103-1, 1103-2, 1103-3 are each linked to one or more of those object clusters 1104-1 through 1104-3. Specifically, scene 1103-1 is linked to both object cluster 1104-1 and object cluster 1104-2 because the scene 1103-1 includes a couch object 1105-1 and a table object 1106-2, as illustrated by links 1116-2, 1116-5. Scene 1103-2 is linked to object cluster 1104-1, as illustrated by link 1116-3 because the scene 1103-2 includes couch object 1105-2. Scene 1103-3 is linked to object clusters 1104-1 and 1104-3, as illustrated by links 1116-4 and 1116-6 because the scene 1103-3 includes a couch object 1105-3 and a fireplace object 1108-1. In this example, once the scenes 1103-1, 1103-2, 1103-3 that are linked to one or more of the object clusters 1104-1, 1104-2, 1104-3 are determined, the matching scenes 1103-1, 1103-2, 1103-3 may be ranked based on the number of co-occurrences of objects from those matching scenes with objects from the query scene 1101-1. In this example, scene 1103-3 or 1103-1 may be assigned the highest rank because they are each linked to two of the object clusters that are also linked to the query scene 1101-1. In comparison, scene 1103-2 may receive a lower rank because it is only linked to a single object cluster 1104-1.

Referring back to FIG. 11A, the scenes determined to have the highest object co-occurrence with the selected scene 1101-1 are presented in ranked order, with the scene having the highest number of co-occurring objects presented first.

As illustrated, the disclosed implementations allow users to select a query scene that includes multiple objects (and/or select multiple objects from a scene) and receive, for example, matching scenes that may be visually different than the query scene that also include the same or similar objects as the query scene or selected multiple query objects. By viewing other, different scenes that also include co-occurring objects with those of the selected scene (or multiple selected objects), the user is able to explore and experience the objects when presented in different environments, with different objects, in different configurations, etc., and thereby gain a better understanding and appreciation of the objects of a scene (or multiple selected objects).

Figure 12:
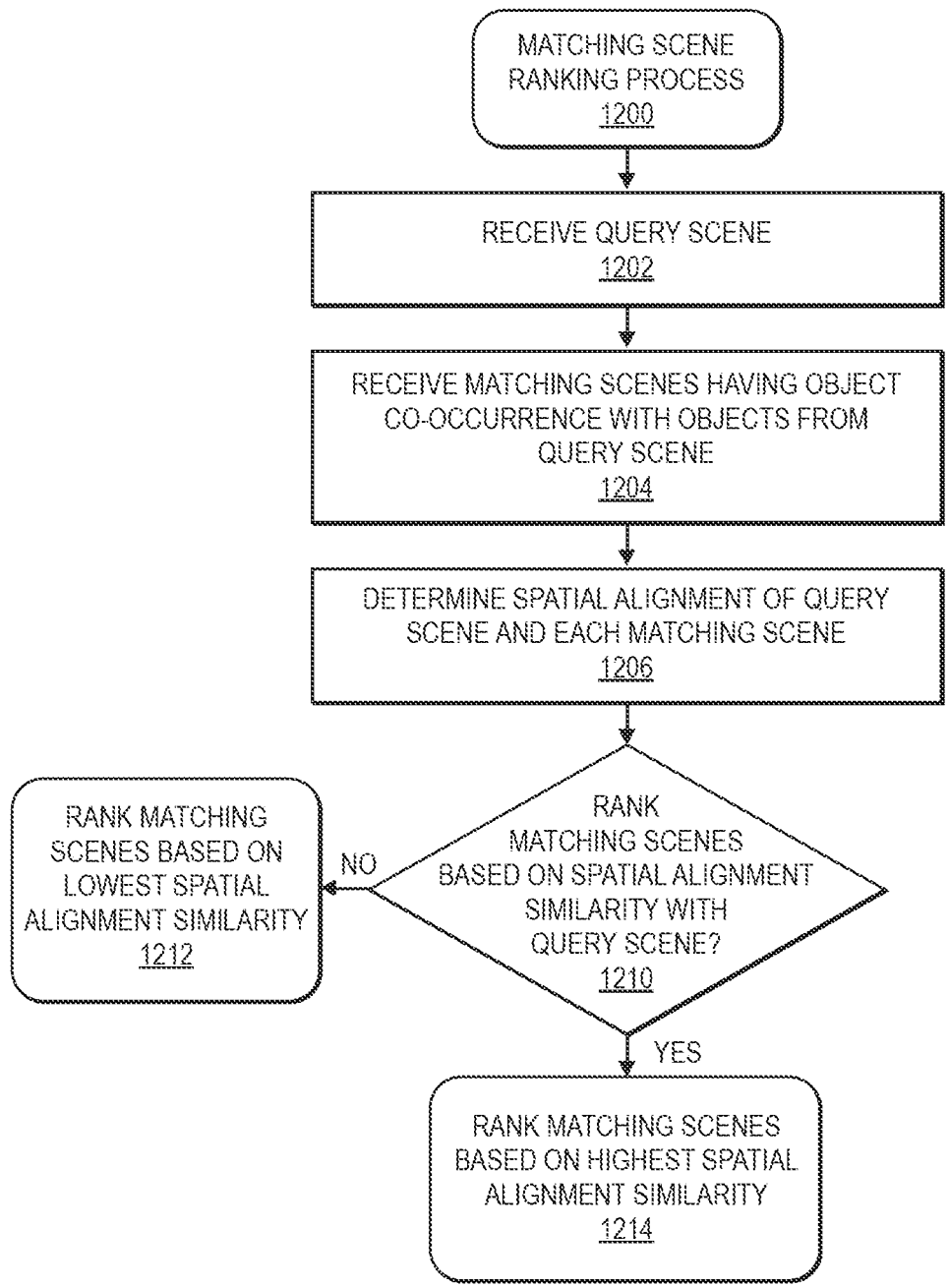
FIG. 12 is an example matching scene ranking process, in accordance with described implementations.

FIG. 12 is an example matching scene ranking process, in accordance with described implementations. The example process 1200 may be performed as a secondary (or alternative) ranking to a ranking of matching scenes determined from one of the example processes discussed above, such as example process 1100 (FIG. 11A) or example process 700 (FIG. 7A).

The example process 1200 begins upon receipt of the selected scene and matching scenes that have one or more co-occurring objects with the query scene, as in 1202/1204. As discussed above, a query scene may be any scene viewed by a user and matching scenes correspond to any scene determined from the disclosed implementations to include one or more co-occurring objects with the query scene.

For the query scene and each of the matching scenes, a spatial alignment is determined based on the positioning of objects in those scenes with respect to other objects in the scene, as in 1206. Spatial alignment of objects within a scene may be done based on a variety of image processing algorithms that determine positioning of different objects (object segments) within a scene with respect to other objects within the scene. In some implementations, spatial alignment for a scene may be determined based on the objects co-occurring with objects in the query scene.

Returning to FIG. 12, a determination is then made as to whether ranking of the matching scenes is to be based on spatial alignment similarity with the query scene, as in 1210. If it is determined that ranking of scenes is to be based on a similarity between spatial alignment with the query scene, those matching scenes with a higher spatial alignment similarity to the query scene are ranked higher than those with less similarity in spatial alignment when compared to the query scene, as in 1214. Alternatively, if it is determined that the scenes are not to be ranked on spatial similarity with the query scene, the ranking is reversed and scenes that are the most dis-similar in spatial alignment similarity when compared to the query scene are assigned higher ranks than those that are spatially similar to the query scene, as in 1212.

Figure 13:
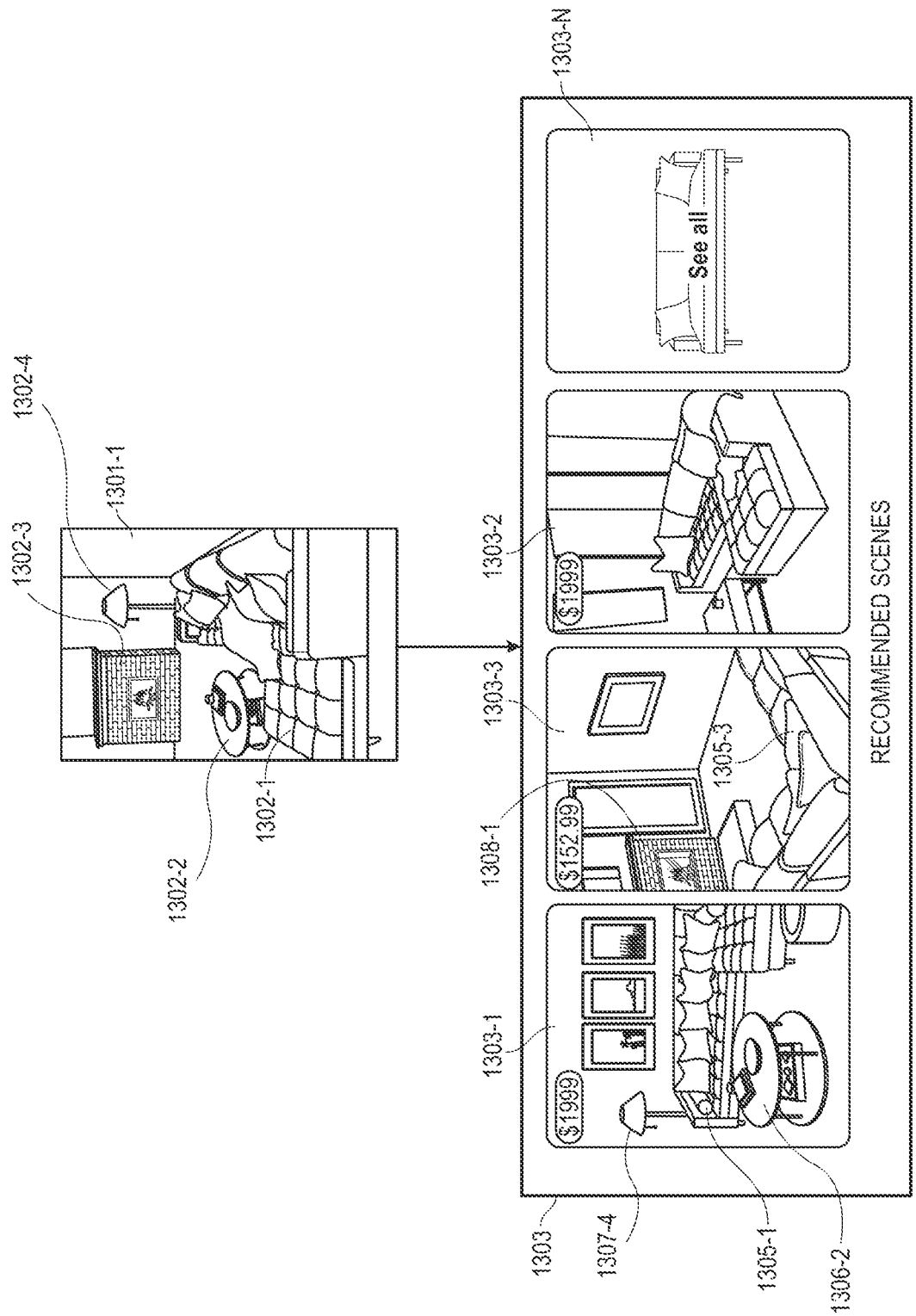
FIG. 13 is an example user interface to select a query scene and receipt of recommended matching scenes based on the example matching scene recommendation process of FIG. 10 and the example ranking process of FIG. 12, in accordance with described implementations.

FIG. 13 is an example user interface to select a query scene 1301-1 and receipt of recommended matching scenes 1303 based on the example matching scene recommendation process of FIG. 10 and the example ranking process of FIG. 12, in accordance with described implementations.

In the illustrated example, the query scene 1301-1 includes a couch object 1302-1, a table object 1302-2, a fireplace object 1302-3, and a lamp object 1302-4. The example process 1000, discussed above, returns matching scenes 1303-1, 1303-2, 1303-3, and optionally other results that may be viewed by selecting the see all link 1303-N, all of which include objects that are co-occurrent with objects of the query scene 1301-1. In the illustrated example, the matching scenes 1303 are further ranked based on the spatial alignment similarity between the query scene 1301 and the matching scenes 1303. In this example, scene 1303-1 is assigned the highest rating because the spatial alignment between the couch object 1302-1, table object 1302-2, and lamp object 1302-4 is very similar to the spatial alignment of the couch object 1305-1, table object 1306-2, and lamp object 1307-4. As can be seen, even though the objects represented by the scenes 1301-1 and 1303-1 are from different perspectives, the spatial alignment between the represented objects is very similar. In comparison, scene 1303-3 is assigned a second highest rank because the spatial alignment of the couch object 1305-3 and the fireplace object 1308-1 is similar to the spatial alignment of the couch object 1302-1 and the fireplace object 1302-3 of the query scene 1301-1.

As illustrated, the disclosed implementations allow users to select a query scene that includes multiple objects (and/or select multiple objects from a query scene) and receive, for example, matching scenes that may be visually different than the query scene that also include the same or similar objects as the selected query scene or selected multiple query objects and in which those objects have a similar spatial alignment as the objects represented in the query scene (or dis-similar). By viewing other, different scenes that also include co-occurring objects with similar spatial alignment with those of the query scene (or multiple selected query objects), the user is able to explore and experience the objects, similarly positioned, when presented in different environments, with different objects, etc., and thereby gain a better understanding and appreciation of the objects of a query scene (or multiple selected objects).

Figure 14:
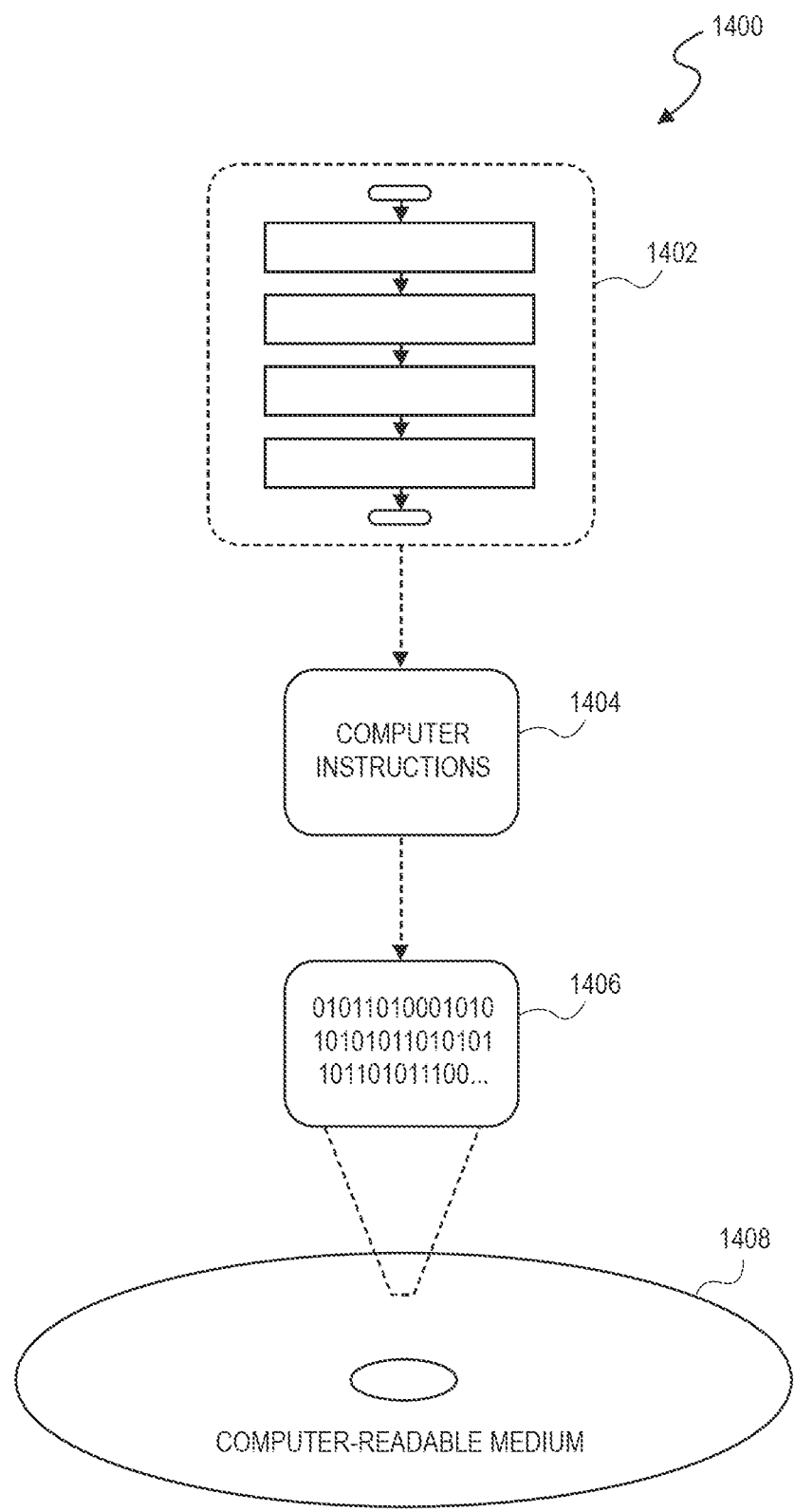
FIG. 14 is a block diagram illustrating an exemplary computer readable medium encoded with instructions for performing the disclosed implementations.

FIG. 14 is a block diagram illustrating an exemplary computer readable medium 1400 encoded with instructions for executing the disclosed implementations. More particularly, the exemplary computer readable medium 1400 comprises a computer-readable medium 1408 (e.g., a CD-R, DVD-R or a platter of a hard disk drive), on which is encoded computer-readable data 1406. This computer-readable data 1406 in turn comprises a set of computer instructions 1404 configured to operate according to one or more of the principles set forth herein. In one such implementation 1402, the processor-executable instructions 1404 may be configured to perform a method, such as at least some of exemplary processes discussed above with respect to FIGS. 2, 4, 6, 10, and 12. In another such implementation, the processor-executable instructions 1404 may be configured to implement a system on a computing device, such as at least some of the exemplary, executable components of computing device 1500 of FIG. 15, as described below. Many such computer readable media may be devised, by those of ordinary skill in the art, which are configured to operate in accordance with the techniques presented herein.

Figure 15:
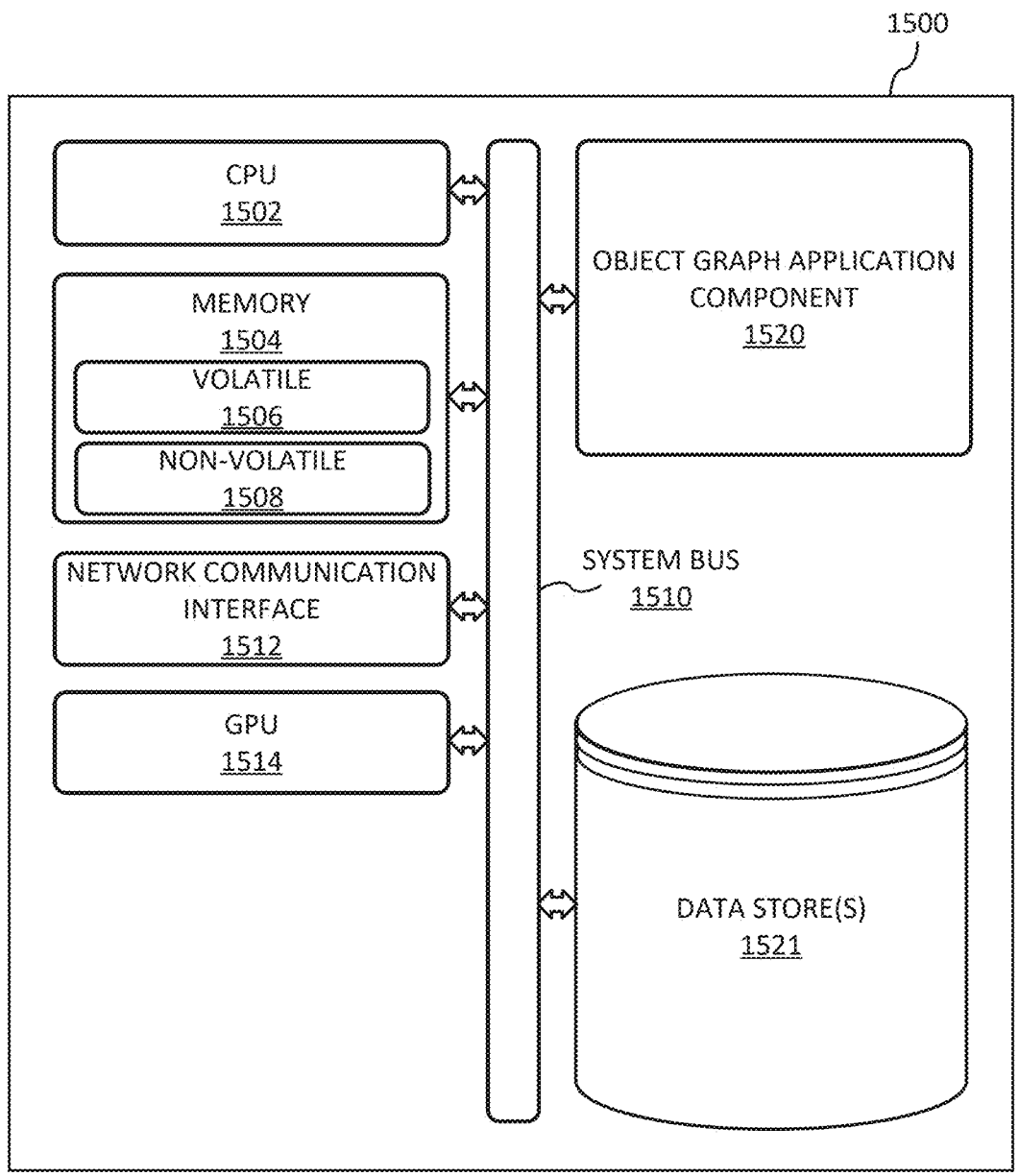
FIG. 15 is a block diagram illustrating an exemplary computing system (or computing device) suitably configured for implementing a machine learning system and/or other aspects of the disclosed implementations.

FIG. 15 is a block diagram illustrating an exemplary computing system 1500 (or computing device) suitably configured for implementing one or more of the disclosed implementations. The computing system 1500 typically includes one or more central processing units (or CPUs), such as CPU 1502, and further includes at least one memory 1504. The CPU 1502 and memory 1504, as well as other components of the computing system, are interconnected by way of a system bus 1510.

As will be appreciated by those skilled in the art, the memory 1504 typically (but not always) comprises both volatile memory 1506 and non-volatile memory 1508. Volatile memory 1506 retains or stores information so long as the memory is supplied with power. In contrast, non-volatile memory 1508 is capable of storing (or persisting) information even when a power supply is not available. Generally speaking, RAM and CPU cache memory are examples of volatile memory 1506 whereas ROM, solid-state memory devices, memory storage devices, and/or memory cards are examples of non-volatile memory 1508.

As will be further appreciated by those skilled in the art, the CPU 1502 executes instructions retrieved from the memory 1504, from computer readable media, such as computer readable media 1408 of FIG. 14, and/or other executable components in carrying out the various functions of the disclosed implementations. The CPU 1502 may be comprised of any of a number of available processors such as single-processor, multi-processor, single-core units, and multi-core units, which are well known in the art.

Further still, the illustrated computing system 1500 typically also includes a network communication interface 1512 for interconnecting this computing system with other devices, computers and/or services over a computer network, such as the Internet. The network communication interface 1512, sometimes referred to as a network interface card or NIC, communicates over a network using one or more communication protocols via a physical/tangible (e.g., wired, optical fiber, etc.) connection, a wireless connection such as Wi-Fi or Bluetooth communication protocols, NFC, or a combination thereof. As will be readily appreciated by those skilled in the art, a network communication interface, such as network communication component 1512, is typically comprised of hardware and/or firmware components (and may also include or comprise executable software components) that transmit and receive digital and/or analog signals over a transmission medium (i.e., the network).

The illustrated computing system 1500 may also include a graphics processing unit (GPU) 1514. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to convolution processes of a machine learning model/neural network that manipulate large amounts of data, as described above. Indeed, one or more GPUs, such as GPU 1514, are viewed as important processing components when conducting machine learning techniques. Also, and according to various implementations, while GPUs are often included in computing systems and available for processing convolutions of machine learning models, such as GPU 1514 of computing system 1500, multiple GPUs are also often deployed as online GPU services or farms and machine learning processing are advantageously directed to conducting the various layers/convolutions of a neural network as described in regard to the exemplary network environment 1600 of FIG. 16.

The computing system 1500 further includes an executable object graph application component 1520. In execution on the computing system 1500, the object graph application component 1520 operates in a similar manner to that described herein. Indeed, the object graph application component 1520 receives scenes of a corpus, determines objects in each scene, extracts those objects as object segments, determines and generates embedding vectors representative of each object, generates object clusters, and creates and stores links between objects/object segments, object clusters, and scenes.

As mentioned above, machine learning models comprising multiple layers of processing are best performed by GPUs, such as GPU 1514, rather than central processing units (CPUs), such as CPU 1502. Indeed, GPUs are specifically designed to manipulate large amounts of memory and perform floating point operations on a faster and larger scale than are CPUs. This is significant when processing large data sets comprising data-rich items of content, such as images/scenes. Indeed, the abilities of the GPU allow the machine learning models to solve linear algebra equations, conduct statistical analysis, regressions, and the like in an efficient and speedy manner, especially when compared to that same work on a CPU. On the other hand, while GPUs excel in processing floating point operations and manipulating large amounts of memory, CPUs can be effectively and efficiently directed to identifying the information and/or data that one or more GPUs should process.

The system 1500 may also include or be connected with one or more data stores 1521. Data stores may maintain any of a variety of information including, but not limited to user profiles, scenes, links between objects or object segments and scenes, embedding vectors, etc.

Figure 16:
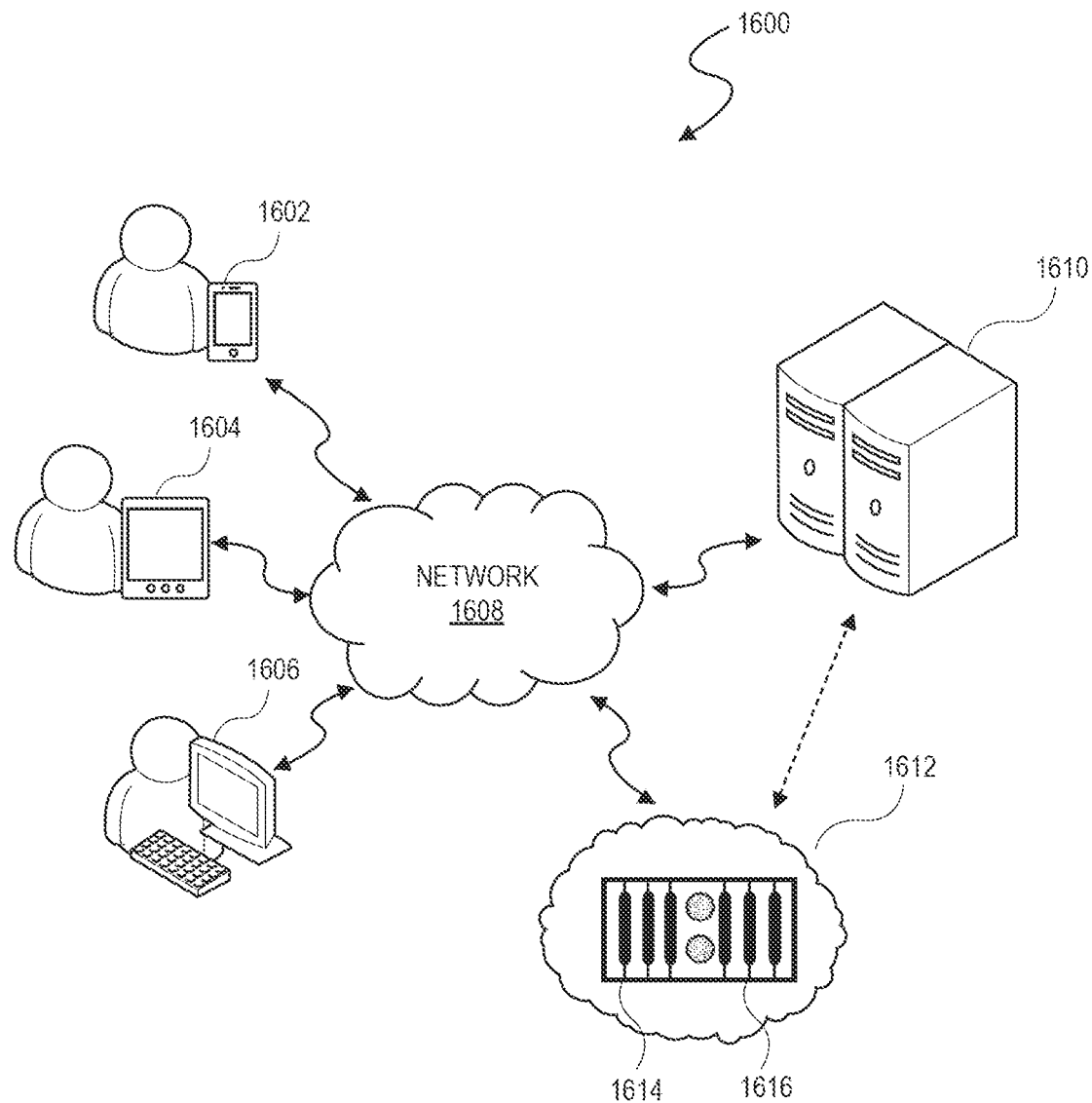
FIG. 16 is a block diagram illustrating an exemplary network environment suitable for implementing aspects of the disclosed subject matter.

FIG. 16 is a block diagram illustrating an exemplary network environment 1600 suitable for implementing aspects of the disclosed subject matter. In particular, the network environment includes one or more computer users operating via computing devices, such as computing devices 1602, 1604, 1606, also referred to herein as client devices, for connecting over a network 1608 with other online services, such as an object graph system 1610. As will be appreciated by those skilled in the art, the user computers, also referred to herein as client devices, may comprise any of a variety of computing devices such as, by way of illustration and not limitation, tablet computers (such as tablet computer 1604), laptop computers, desktop computers (such as desktop computer 1606), smart phones (such as smart phone 1602), and the like.

The user computers 1602-1606 communicate with other computers and/or devices over one or more networks, such as network 1608. As will be appreciated by those skilled in the art, the network 1608 is a telecommunication network over which computing devices and network enabled processes and/or services may communicate and/or exchange data. By way of illustration, a computer network such as network 1608 may comprise any of a local area network or LAN, a wide area network or WAN, or combinations of the two. According to various implementations of the disclosed subject matter, the network 1608 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including user computing devices 1602-1606, can communicate with the network 1608 by way of a wired connection, a wireless connection, an optical connection, or any combination of these.

Also included in the exemplary network environment 1600 is an object graph system 1610 on a network computing system. As described above, the object graph system 1610 is configured to receive a request, such as a selection of a query object, from a computer over the network 1608 and, in response, determine one or more matching scenes that include that same or similar object, as discussed herein.

As illustrated in the exemplary network environment 1600, and in accordance with aspects of the disclosed subject matter, the object graph system 1610 may utilize local, tightly coupled, and/or remote cloud-based GPU clusters, such as cloud-based GPU cluster 1612 that comprises one or more GPUs, such as GPUs 1614 and 1616. The GPU cluster 1612 may be implemented and maintained by the object graph system 1610. Alternatively, and as shown in the exemplary network environment 1600, the GPU cluster 1612 may be implemented as an online service accessible to the object graph system 1610.

With regard to the processing by the GPU cluster 1612, and many other processes, it should be appreciated that the operations of these processes are often conducted in an offline, batch mode. Indeed, processing items through a GPU-cluster are made in an offline manner to produce a data set of pre-processed content that can be used by the object graph system 1610 to determine scenes that are linked to a selected object of interest.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow charts of FIGS. 2, 4, 6, 8, 10, and 12, orders in which such methods or processes are presented are not intended to be construed as any limitation on the claimed implementations, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similarly," or "substantially" as used herein, represent a value, amount, or characteristic close to the stated value, amount, or characteristic that still performs a desired function or achieves a desired result. For example, the terms "about," "approximately," "generally," "nearly," "similarly," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:
   one or more processors; and
   a memory storing program instructions that, when executed by the one or more processors, cause the one or more processors to at least:
      generate, for each object of a first plurality of objects represented in a first plurality of scenes, a respective embedding vector representative of each object;
      determine, based at least in part on distances between the respective embedding vectors, a first object cluster that includes a first plurality of embedding vectors that includes at least some of the respective embedding vectors and corresponds to a second plurality of objects of the first plurality of objects;
      generate an object cluster embedding vector representative of the first object cluster;
      generate links between the first object cluster and a second plurality of scenes of the first plurality of scenes that include one or more of the second plurality of objects, the generating links comprising determining a similarity score between each scene of the second plurality of scenes and the object cluster, the similarity score for a first scene of the second plurality of scenes being based on a similarity between an embedding vector for the object represented in the first scene and the object cluster embedding vector;
      receive, from a client device, a user selection of a query object from a scene presented on the client device;
      determine that the query object is associated with the first object cluster;
      determine one or more first scenes from the second plurality of scenes based on the links between the first object cluster and the second plurality of scenes; and
      provide at least one first scene of the one or more first scenes to the client device for presentation.

2. The computing system of claim 1, wherein determination of the one or more first scenes includes:
   determining, based at least in part on the query object, rankings for at least a portion of the second plurality of scenes; and
   determining the one or more first scenes from the second plurality of scenes based at least in part on the rankings.

3. The computing system of claim 2, wherein determining the rankings are based at least in part on a co-occurrence of the query object and other objects in the second plurality of scenes.

4. The computing system of claim 2, wherein determining the rankings are based at least in part on a distance between a query embedding representing the query object and the object cluster embedding vector.

5. The computing system of claim 1, wherein the program instructions, when executed by the one or more processors, further cause the one or more processors to at least:

determine, based at least in part on distances between the respective embedding vectors, a first plurality of object clusters; and generate links between the first plurality of object clusters and at least a portion of the first plurality of scenes.

6. The computing system of claim 5, wherein the program instructions, when executed by the one or more processors, further cause the one or more processors to at least:

in response to an indication of a plurality of query objects:
determine that a second plurality of object clusters of the first plurality of object clusters correspond to the plurality of query objects;
determine at least one first scene from the at least a portion of the first plurality of scenes; and
provide the at least one first scene as a matching scene.

7. The computing system of claim 6, wherein determination of the at least one scene includes:

determining, based at least in part on a number of co-occurring objects in the at least a portion of the first plurality of scenes and the plurality of query objects, rankings for the at least a portion of the second plurality of scenes; and
determining the at least one first scene from the at least a portion of the first plurality of scenes based at least in part on the rankings.

8. The computing system of claim 6, wherein indication of the plurality of query objects is performed via a selection of a query scene.

9. The computing system of claim 8, wherein determination of the at least one scene includes:

determining rankings for the at least a portion of the second plurality of scenes based at least in part on a spatial alignment between the query scene and the at least a portion of the second plurality of scenes; and
determining the at least one first scene from the at least a portion of the first plurality of scenes based at least in part on the rankings.

10. A computer-implemented method, comprising:

segmenting a plurality of scenes into a plurality of object segments, each object segment of the plurality of object segments corresponding to an object represented in at least one of the plurality of scenes;
generating, for each object segment, a respective embedding vector representative of the object segment;
determining, based at least in part on distances between the respective embedding vectors, a first object cluster that includes a first plurality of embedding vectors that includes at least some of the respective embedding vectors and corresponds to a first plurality of objects represented in a first plurality of scenes of the plurality of scenes;
generating an object cluster embedding vector representative of the first object cluster;
generating links between the first object cluster and the first plurality of scenes, the generating links comprising determining a similarity score between each scene of the first plurality of scenes and the first object cluster, the similarity score for a first scene of the first plurality of scenes being based on a similarity between an embedding vector for the object represented in the first scene and the object cluster embedding vector;
receiving, from a client device, a user selection of a query object from a scene presented on the client device;
determining that the query object is associated with the first object cluster;

determining one or more first scenes from the first plurality of scenes based on the links between the first object cluster and the first plurality of scenes; and
providing at least one first scene of the one or more first scenes to the client device for presentation.

11. The computer-implemented method of claim 10, wherein determining the one or more first scenes from the first plurality of scenes is based at least in part on a distance between a query embedding representing the query object and a representative embedding vector for the first object cluster.

12. The computer-implemented method of claim 10, further comprising:

determining, based at least in part on distances between the respective embedding vectors, a first plurality of object clusters;
receiving an indication of a query objects scene;
determining that a second plurality of object clusters of the first plurality of object clusters corresponds to objects represented in the query scene;
determining, based at least in part on the second plurality of object clusters, at least one first scene from the plurality of scenes; and
providing the at least one first scene as a matching scene.

13. The computer-implemented method of claim 12, wherein determining the at least one first scene from the plurality of scenes is based at least in part on a number of co-occurring objects between the objects represented in the query scene and further objects represented in the at least one first scene.

14. The computer implemented method of claim 10, wherein determination of the one or more first scenes includes:

determining, based at least in part on the query object, rankings for at least a portion of the first plurality of scenes; and
determining the one or more first scenes from the first plurality of scenes based at least in part on the rankings.

15. One or more non-transitory computer readable media having instructions that, when executed by one or more processors, cause the one or more processors to perform operations comprising:

generating, for each object of a first plurality of objects represented in a first plurality of scenes, a respective embedding vector representative of each object;
determining, based at least in part on distances between the respective embedding vectors, a first object cluster that includes a first plurality of embedding vectors that includes at least some of the respective embedding vectors and corresponds to a second plurality of objects of the first plurality of objects;
generating an object cluster embedding vector representative of the first object cluster;
generating links between the first object cluster and a second plurality of scenes of the first plurality of scenes that include one or more of the second plurality of objects, the generating links comprising determining a similarity score between each scene of the second plurality of scenes and the object cluster, the similarity score for a first scene of the second plurality of scenes being based on a similarity between an embedding vector for the object represented in the first scene and the object cluster embedding vector;
receiving, from a client device, a user selection of a query object from a scene presented on the client device;
determining that the query object is associated with the first object cluster;

determining one or more first scenes from the second plurality of scenes based on the links between the first object cluster and the second plurality of scenes; and providing at least one first scene of the one or more first scenes to the client device for presentation.

16. The one or more computer readable media of claim 15, wherein determination of the one or more first scenes includes:

determining, based at least in part on the query object, rankings for at least a portion of the second plurality of scenes; and determining the one or more first scenes from the second plurality of scenes based at least in part on the rankings.

17. The one or more computer readable media of claim 15, wherein the program instructions, when executed by the one or more processors, further cause the one or more processors perform operations comprising:

determining, based at least in part on distances between the respective embedding vectors, a first plurality of object clusters; and generating links between the first plurality of object clusters and at least a portion of the first plurality of scenes.

18. The one or more computer readable media of claim 17, wherein the program instructions, when executed by the one or more processors, further cause the one or more processors to perform operations comprising:

in response to an indication of a plurality of query objects:

determining that a second plurality of object clusters of the first plurality of object clusters correspond to the plurality of query objects;

determining at least one first scene from the at least a portion of the first plurality of scenes; and providing the at least one first scene as a matching scene.

* * * * *